US012638854B1

(12) United States Patent
Choudry et al.

(10) Patent No.: US 12,638,854 B1
(45) Date of Patent: May 26, 2026

(54) TRACKING FOR VEHICLE INTERACTION

(71) Applicant: Zoox, Inc., Foster City, CA (US)

(72) Inventors: Muhammad Umar Choudry, Seattle, WA (US); Gerardo Cid Fernandez, Oakland, CA (US); Jingyu Tan, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 142 days.

(21) Appl. No.: 18/590,928

(22) Filed: Feb. 28, 2024

(51) Int. Cl.
| | |
|---|---|
| *G05D 1/222* | (2024.01) |
| *G06F 1/16* | (2006.01) |
| *G06F 3/01* | (2006.01) |
| *G06V 20/56* | (2022.01) |

(52) U.S. Cl.
CPC ............. *G05D 1/222* (2024.01); *G06F 1/163* (2013.01); *G06F 3/012* (2013.01); *G06F 3/013* (2013.01); *G06F 3/017* (2013.01); *G06V 20/56* (2022.01)

(58) Field of Classification Search
CPC ......... G05D 1/222; G06F 1/163; G06F 3/012; G06F 3/013; G06F 3/017; G06V 20/56
See application file for complete search history.

(56) References Cited

U.S. PATENT DOCUMENTS

| | | | | |
|---|---|---|---|---|
| 9,434,309 | B1 * | 9/2016 | Smyth | ....................... G06T 7/20 |
| 10,268,191 | B1 | 4/2019 | Lockwood et al. | |
| 11,079,753 | B1 * | 8/2021 | Roy | ....................... G05D 1/028 |
| 11,480,961 | B1 | 10/2022 | Chebiyyam et al. | |
| 11,753,029 | B1 | 9/2023 | Gregory et al. | |

| | | | | |
|---|---|---|---|---|
| 2013/0335320 | A1 | 12/2013 | Mori et al. | |
| 2015/0190925 | A1 * | 7/2015 | Hoffman | ................... B25J 9/161 901/47 |
| 2015/0234186 | A1 * | 8/2015 | Meadows | .............. B60K 35/10 345/8 |
| 2016/0048249 | A1 * | 2/2016 | Chen | ....................... G06F 3/011 701/2 |
| 2018/0004204 | A1 * | 1/2018 | Rider | ..................... B60K 35/60 |
| 2018/0348000 | A1 | 12/2018 | Cai et al. | |
| 2019/0098070 | A1 * | 3/2019 | Kim | ......................... G06F 3/013 |

(Continued)

FOREIGN PATENT DOCUMENTS

| | | | | |
|---|---|---|---|---|
| EP | 4344198 A1 * | 3/2024 | .......... | G06F 3/0487 |
| JP | 2007288611 A | 11/2007 | | |
| WO | WO-2019010411 A1 * | 1/2019 | .......... | A63F 13/525 |

OTHER PUBLICATIONS

Office Action for U.S. Appl. No. 18/649,870, Dated Sep. 23, 2025, 27 pages.

*Primary Examiner* — Calvin Cheung
(74) *Attorney, Agent, or Firm* — Lee & Hayes, P.C.

(57) ABSTRACT

Techniques for interacting with a remote vehicle using tracked gestures are described herein. A vehicle may receive sensor data, which may be combined to generate a representation of the vehicle traversing the environment. The representation may include features of the environment, such as people and/or objects. The representation may be displayed at a user interface. In some instances, the user interface may be associated with a wearable computing device and may be associated with a user, such as a remote operator. The wearable computing device may receive natural user input data of a user. The computing device may then determine an action associated with the vehicle based on the natural user input and transmit information to the vehicle to perform the action.

20 Claims, 6 Drawing Sheets

(56)                    References Cited

U.S. PATENT DOCUMENTS

| 2020/0148113 A1 | 5/2020 | Coburn et al. |
| 2021/0070177 A1 | 3/2021 | Nitze-Nelson et al. |
| 2022/0237733 A1 | 7/2022 | So |
| 2023/0060435 A1 | 3/2023 | Funke |
| 2024/0012411 A1 | 1/2024 | Johnson et al. |
| 2024/0106989 A1 | 3/2024 | Nohara et al. |
| 2024/0411306 A1 | 12/2024 | Boesch et al. |
| 2025/0100451 A1 | 3/2025 | Cho et al. |

* cited by examiner

600 ⟍

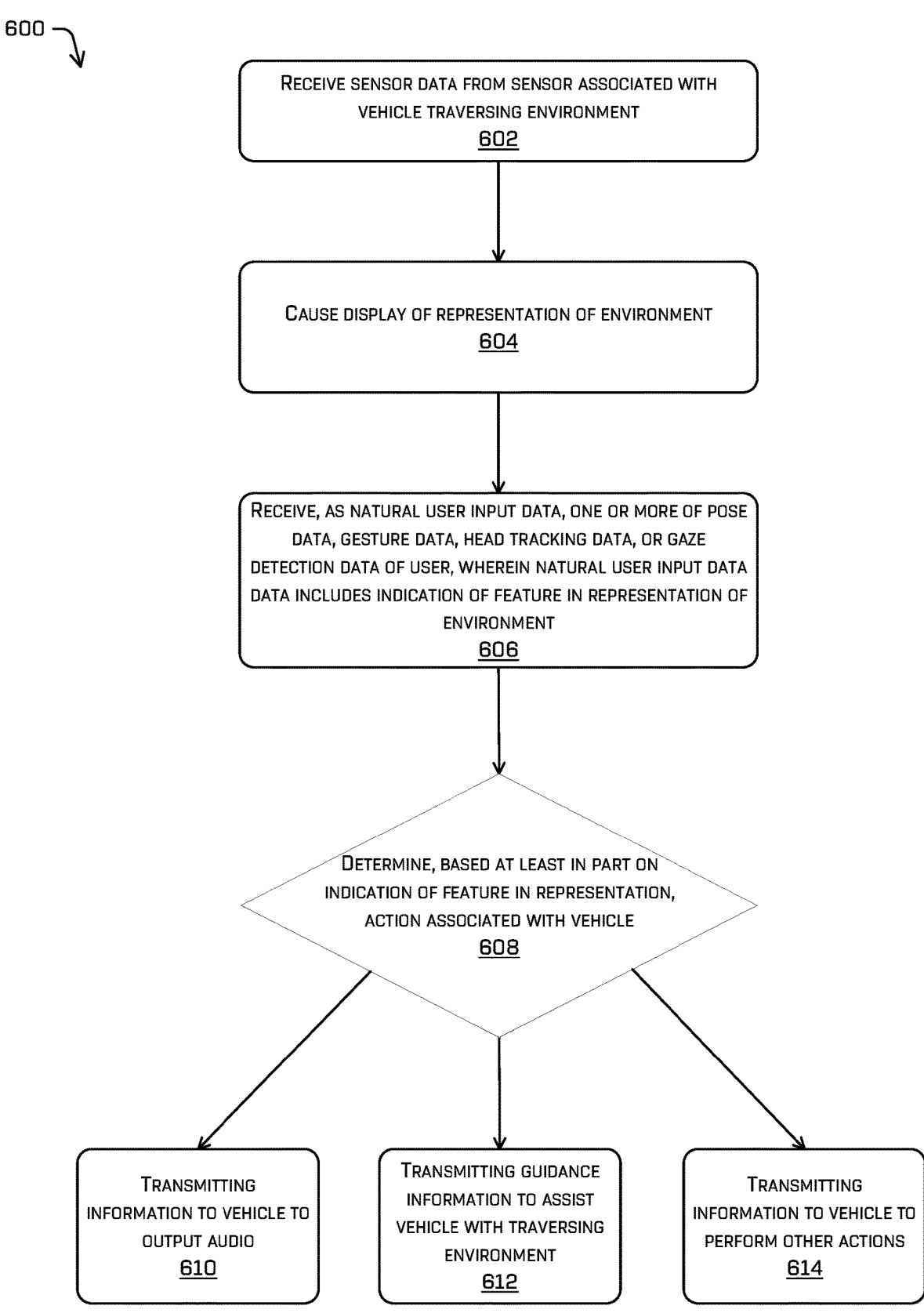

RECEIVE SENSOR DATA FROM SENSOR ASSOCIATED WITH
VEHICLE TRAVERSING ENVIRONMENT
602

CAUSE DISPLAY OF REPRESENTATION OF ENVIRONMENT
604

RECEIVE, AS NATURAL USER INPUT DATA, ONE OR MORE OF POSE
DATA, GESTURE DATA, HEAD TRACKING DATA, OR GAZE
DETECTION DATA OF USER, WHEREIN NATURAL USER INPUT DATA
DATA INCLUDES INDICATION OF FEATURE IN REPRESENTATION OF
ENVIRONMENT
606

DETERMINE, BASED AT LEAST IN PART ON
INDICATION OF FEATURE IN REPRESENTATION,
ACTION ASSOCIATED WITH VEHICLE
608

TRANSMITTING
INFORMATION TO VEHICLE TO
OUTPUT AUDIO
610

TRANSMITTING GUIDANCE
INFORMATION TO ASSIST
VEHICLE WITH TRAVERSING
ENVIRONMENT
612

TRANSMITTING
INFORMATION TO VEHICLE TO
PERFORM OTHER ACTIONS
614

FIG. 6

TRACKING FOR VEHICLE INTERACTION

BACKGROUND

Vehicles operate in dynamic environments in which conditions are often changing. For example, changing conditions may include pedestrians, emergency personnel (e.g., paramedics, police officers, traffic controllers), accidents, construction, and the like. While autonomous vehicles may be programmed to adjust in response to the changing conditions, in some instances remote operations may provide assistance and/or guidance for the operations of the vehicle. When a vehicle requires assistance from remote operators, it is important for the remote operators to act promptly. Delays by the remote operators may impede progress of the vehicle and/or potentially impact the safety of any passengers. In some instances, delays by the remote operators may stem from a lack of situational awareness, particularly in chaotic conditions.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 6 is a flowchart depicting an example process for transmitting information to a vehicle to perform an action using natural user input-tracked remote operations, according to at least some examples.

DETAILED DESCRIPTION

Figure 1:
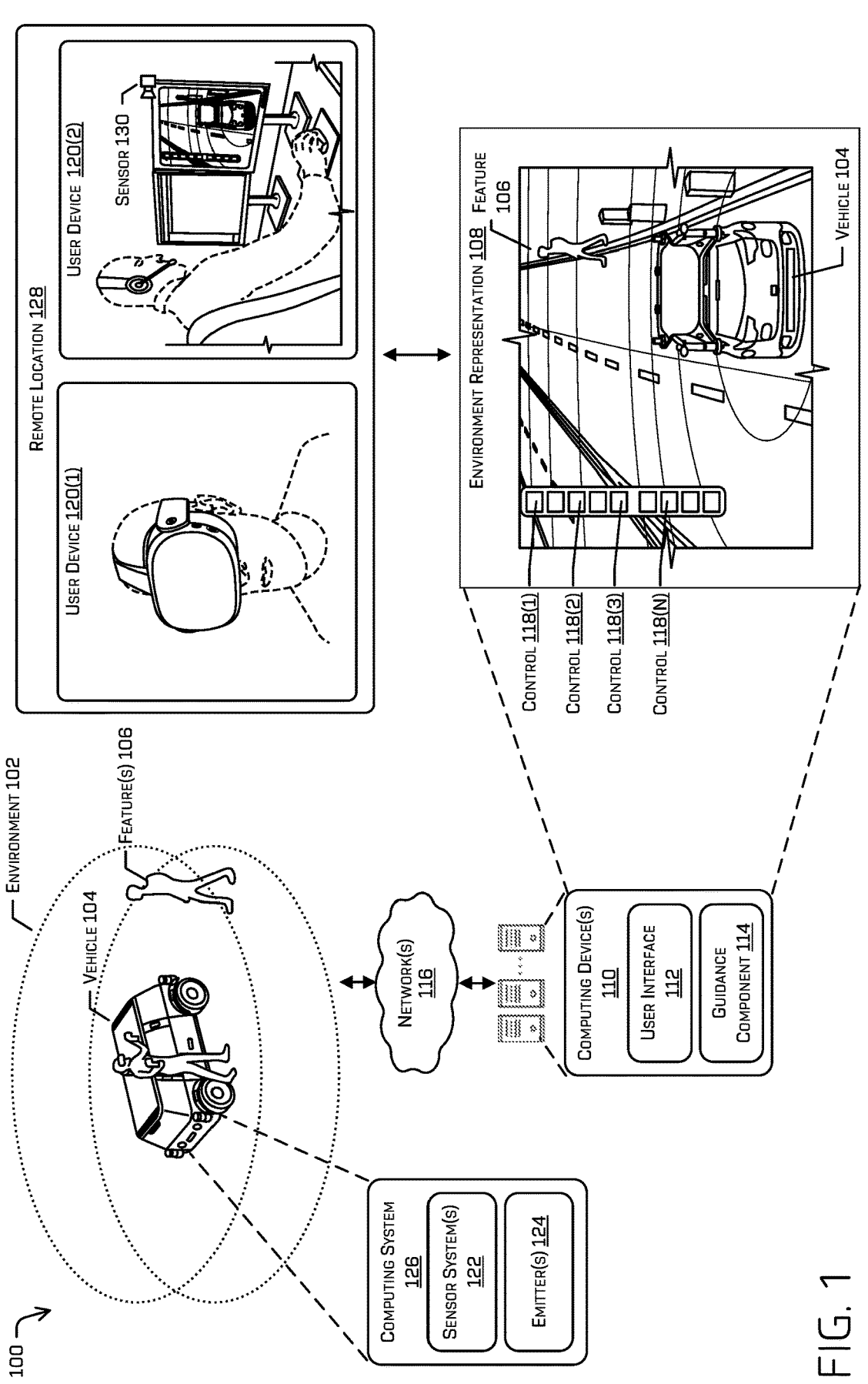
FIG. 1 is an example environment for implementing natural user input-tracked remote operations for vehicle interaction as described herein, according to at least some examples.

As discussed above, it is important for remote operators to be able to provide guidance to vehicles quickly and efficiently.

This application describes techniques for providing guidance and/or other input to a vehicle from a computing device remote from the vehicle via tracked natural user input. The guidance and/or other information may assist or configure the vehicle to perform an action, such as traversing a portion of an environment, communicating with one or more pedestrians in a vicinity of the vehicle, or the like. In some examples, a remote computing device of a remove operations service may receive sensor data from the vehicle traversing the environment. The vehicle may include an autonomous or semi-autonomous vehicle with a vehicle computing system configured to receive guidance from the remote computing device of the remote operations service. In some instances, a vehicle computing system associated with the vehicle may receive sensor data from one or more sensors (e.g., cameras, motion detectors, lidar, radar, time of flight, etc.) associated with the vehicle. Based on the sensor data, a representation of the environment may be presented via a graphical user interface (GUI) associated with the remote computing device. In some examples, the representation of the environment may include a 3D representation of the environment, which may be rendered using, for example, a virtual reality headset or other remote operator computing device. For example, a user associated with a remote operator computing device may be provided with a computer-generated representation of the environment, which may include one or more features of objects in the environment (e.g., other vehicles, pedestrians, buildings, lanes, intersections, signs, street lights, etc.). This way, the user may be provided a perspective into the environment (e.g., from a perspective of the vehicle, a top-down perspective, etc.) so as to become aware of the environment and provide vehicle guidance quickly and efficiently. In some examples, the remote computing device may be configured to track natural user input associated with a user of the remote computing device (e.g., head position, head motion, eye gaze position, eye gaze motion, gestures, user input via the GUI, user pose, user posture, user voice, etc.). The natural user input may include a movement associated with the user of the remote computing device and/or non-movement associated with the posture or pose of a user of the remote computing device (e.g., the user when the user is stationary in a pose, where the pose may include an overall body shape and/or configuration). In some instances, the natural user input may indicate, and/or be directed to, a feature in the environment (e.g., object, person, etc.) with which the remote computing device determines an action is to be performed by the vehicle. In some instances, the action to be performed by the vehicle may be associated with one or more components of the vehicle (e.g., speakers or other audio output devices, displays or other visual output devices, vehicle doors, and/or the like) and/or may be associated with a change in trajectory of the vehicle. As such, the techniques described herein may improve the safety of the vehicle operating in the environment as the user associated with the remote computing device, such as a remote operator, may be able to quickly become oriented with the vehicle environment, and easily provide vehicle guidance accordingly.

In some instances, a vehicle computing system associated with the vehicle may receive sensor data from one or more sensors (e.g., cameras, motion detectors, lidar, radar, time of flight, etc.) disposed in, on, or otherwise associated with the vehicle. The vehicle computing system may determine, based on the sensor data, that an event associated with the vehicle is occurring or is predicted to occur. For example, the event associated with the vehicle may include an obstacle in the roadway, an emergency situation associated with the vehicle, the presence of emergency personnel, and the like. In response to detecting the event, the vehicle computing system may automatically connect to a remote computing device configured with a GUI according to this disclosure. In various examples, the vehicle computing system may send a request for guidance to the remote computing device, where a user associated with the remote computing device may provide guidance and/or other input for the vehicle. Additionally, or alternatively, the user associated with the remote computing device may continuously monitor the vehicle and provide guidance and/or other input for the vehicle on an as-needed basis.

The remote computing device may be configured to generate a representation of the environment through which the vehicle is traversing (e.g., a model, simulation, estimated state, and the like) based at least in part on the sensor data received from the vehicle. Additionally, or alternatively, a computing system associated with the vehicle may be configured to generate a virtual representation of the environment through which the vehicle is traversing based at least in part on the sensor data. In some examples, the representation may include a three-dimensional (3D) virtual representation of the environment and/or a 360-degree video of the environment, including video images of objects depicted therein. The representation may additionally or alternatively include a computer-generated representation of the environment, including one or more features or objects in the environment through which the vehicle is traversing. For example, the representation may include computer-generated depictions of vehicles, pedestrians, buildings, lanes, intersections, signs, street lights, and other features and/or objects. In some examples, the system may be configured to selectively toggle between the video representation of the environment and the computer-generated representation of the environment, while in some examples the system may be configured to overlay computer-generated images or other data on the video representation of the environment. In some examples, the representation may be from the perspective of the vehicle (e.g., panoptic) or a top-down perspective. In some examples, a user may toggle between the vehicle perspective and the top-down perspective. A GUI of the remote computing device may be configured to output the representation of the vehicle. The GUI may include streaming images captured by a camera on the vehicle. In some instances, the representation may be communicated to a user associated with (e.g., using, wearing, etc.) the remote computing device. In some instances, the user may be a remote operator of a remote operations service for a fleet of autonomous vehicles, where the remote operator is trained to guide vehicles remotely. This way, the representation communicated to the user via the GUI may be assessed by the user to determine an action and/or guidance for the vehicle.

Additionally, or alternatively, the sensor data may be used by the remote computing device to output audio at the remote computing device and/or at a user device associated with the remote computing device (e.g., a speaker of wearable device). For example, the vehicle may obtain sensor data including audio data captured from the environment, where the audio data may be associated with a portion and/or direction of the environment. Based on the portion and/or direction from which the audio data was received by the sensor(s) of the vehicle, the remote computing device may be configured to output the audio data at a speaker such that a user associated with the remote computing device may receive the output of audio data from a similar portion and/or direction of the representation. Example techniques for outputting immersive spatial audio can be found, for example, in U.S. Pat. No. 11,480,961, issued Oct. 25, 2022, and titled "Immersive Sound for Teleoperators," the contents of which is herein incorporated by reference in its entirety for all purposes.

The sensor data may also be used to generate semantic data associated with one or more features of the environment by the vehicle and/or remote computing device. In some instances, the sensor data may be used by the vehicle in order to detect and/or classify objects (e.g., other vehicles, pedestrians, emergency personnel, lanes, buildings, intersections, etc.). In the environment representation, the detected and/or classified objects may be labeled based on semantic data. The labels may be continuously displayed, or may be dynamically displayed based on the natural user input. For instance, a label for an object may be displayed based on the user's head position and/or gaze being toward an object. As another example, the operator may toggle labels on/off for all objects or selected classifications of objects based on selection of a user interface control (e.g., a button or menu displayed on the GUI), by hand gesture, voice input, or any other form of user input. By way of example, and not limitation, the semantic data may include the distance at which a feature is positioned away from the position of the vehicle. Additionally, or alternatively, the semantic data may include characteristics associated with the features in the environment. In some instances, the remote computing device may be configured to use the semantic data to display semantic information in the environment representation that is displayed to the user associated with the remote computing device. For example, the semantic information may be displayed as a "label" for one or more features in the environment. For example, each feature in the environment representation may be labeled, annotated, and/or augmented with semantic information, such as the distance at which the feature is positioned away from the position of the vehicle.

In some instances, the remote computing device may be configured to receive user input by tracking natural user input associated with the user with respect to the environment representation. For example, the user may perform a natural user input (e.g., head movement, head pose, eye movement, eye pose, hand movement, pose, posture, etc.) that may be directed toward a feature in the environment representation (e.g., head movement and/or eye gaze toward a person in the environment, a hand gesture identifying a location in the environment, etc.). Based on the user input, the remote computing device may be configured to determine an indication of the feature in the environment representation. By way of example and not limitation, the remote computing device may determine, based on the duration at which a user directs their eye gaze at a feature in the environment representation, an indication of the feature in the environment representation. In another non-limiting example, the remote computing device may determine, based on the duration at which a user directs their head at a feature in the environment, an indication of the feature in the environment representation. Additionally, or alternatively, the remote computing device may be configured to determine an indication of a feature in the environment representation, where the feature may be a particular point (hereinafter "waypoint") which may be provided as guidance to the vehicle to assist the vehicle in planning a path to traverse a portion of the environment.

Upon the determination of an indication of a feature in the environment representation, the remote computing device may determine an action associated with the feature that may be performed by the vehicle. In some instances, the action may include actuating one or more components associated with the vehicle. For example, the action may include the output of audio at one or more speakers of the vehicle, or activation of a visual indicator (e.g., light, display screen, etc.). Based on the location of the feature in the environment representation indicated by the user, the remote computing device may determine which speaker(s) to cause to output audio (e.g., the speaker(s) with the closest proximity to the feature in the environment representation indicated by the user), and/or which visual indicator(s) to use to output a visual indication (e.g., the visual indicator(s) with the closest proximity to the feature in the environment representation or that has an unobstructed line of sight to the feature). As a non-limiting example of which, a remote operator may view, as a feature, an emergency responder in the environment representation and the action may emit targeted audio (e.g., via beamforming on a speaker array) to the emergency responder such that the remote operator may provide targeted communication, thereby reducing confusion, latency, etc. in an otherwise complex scenario. Additionally, or alternatively, in instances such as emitting target audio based on a remote operator viewing a feature in the environment representation, the audio may also be contemporaneously output at a speaker associated with the remote operator.

In another example, the action may include a suggested trajectory path to be provided as guidance to the vehicle. Based on the location of the feature in the environment representation indicated by the user, such as one or more waypoints, the remote computing device may determine a trajectory path and/or the one or more waypoints that may be communicated to the vehicle as guidance. Additionally, or alternatively, the action may include an adjustment of temperature in the vehicle, the opening of a door of the vehicle, communication on interior audio channels, and/or the like. By way of example, and not limitation, based on the location of the feature in the environment representation, the remote computing device may determine which door(s) to cause to open (e.g., the door(s) with the closest proximity to the feature in the environment representation indicated by the user).

Additionally, or alternatively, the user may perform a natural user input that may be directed toward a feature in the environment representation, where the feature in the environment representation is a door of the vehicle. Based on the indication of the door of the vehicle in the environment representation, the remote computing device may cause display of a group of candidate actions associated with the door (e.g., open, close, etc.) as user interface components, such as controls. The user may then interact with the controls so as to send an instruction to open and/or close the door of the vehicle. In another non-limiting example, the user may perform a natural user input that may be directed toward a door of the vehicle in the environment representation, where the natural user input is a particular movement (e.g., a pinch gesture, a reverse pinch gesture, moving hands together, moving hands apart, etc.). For example, the user may perform a pinch gesture and/or move their hands together, where the remote computing device may send an instruction to the vehicle to close a door. Additionally, or alternatively, the user may perform a reverse pinch gesture and/or move their hands apart, where the remote computing device may send an instruction to the vehicle to open a door.

The remote computing device may determine one or more candidate actions based on the indication of the feature in the environment representation indicated by the user and may cause a group of candidate actions to be displayed at the GUI as one or more user interface components, such as controls. A user may interact with the controls of the GUI to generate an input so as to send an instruction to the vehicle to perform an action. For example, the user may interact with the controls of the GUI by selecting a control with touch (e.g., via a touchscreen or cursor). Additionally, or alternatively, the remote computing device may be configured to further track natural user input, such as head motions, hand gestures, and/or eye gaze movement, to identify a selection of an action. Continuing from the example above, the user may indicate a feature in the environment representation, where the feature is emergency personnel (e.g., a police officer). Based on this indication, the remote computing device may display, at the GUI of the remote computing device, one or more actions that may be performed with respect to the police officer. For example, the action may include the output of an audio message, where the audio message indicates that there is an emergency associated with the vehicle.

Additionally, or alternatively, the user may indicate the selection of the action to output the audio message. Accordingly, the remote computing device may be configured to send information to the vehicle to cause the output of the audio message, where the remote computing device may also be configured to cause the vehicle to output the audio message via a speaker that is closest in proximity to the emergency personnel. Additionally, or alternatively, the remote computing device may be configured to use the semantic data associated with the feature of the environment representation indicated by user to further customize the action to be performed by the vehicle. Continuing from the example above, the remote computing device may be configured send information to the vehicle, and in turn, to cause the vehicle to output the audio message at a volume that is responsive to the proximity of the emergency personnel (e.g., the further the distance the emergency personnel is to the vehicle, the higher the volume of the audio message).

The techniques discussed herein may improve a functioning of a computing device in several ways. Traditionally, remote assistance includes reviewing sensor data, often including multiple views, in order to understand the current situation of the vehicle ("situational awareness") and determine how best to assist the vehicle. However, it can take time for a remote operator to review the multiple different views to achieve situational awareness. By outputting a 3D environment representation at a user interface, the remote operator may be able to more quickly situational awareness. Additionally, tracking the natural user input of the remote operator to identify features, and in turn, actions associated with the vehicle, may allow remote operators to more quickly and easily provide input to assist the vehicle versus traditional approaches. This improves vehicle safety by reducing an amount of time it may take for a remote operator to provide guidance and/or other input for the vehicle, particularly in emergency situations where it may be prudent to act quickly.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a manually driven vehicle, a sensor system, or a robotic platform), and are not limited to autonomous vehicles. In another example, the techniques may be utilized in an aviation or nautical context, or in any system using machine vision (e.g., in a system using image data).

FIG. 1 is an example environment 100 for implementing natural user input-tracked remote operations for vehicle interaction as described herein, according to at least some examples. In general, a user interface 112 may provide environment representation 108 at a user device 120 at a remote location 128 such that a user may provide guidance (e.g., send a suggested trajectory) and/or other input for the vehicle 104 by natural user input tracking.

As depicted in FIG. 1, a remote computing device 110 of remote location 128 may receive sensor data from a vehicle 104 traversing an environment 102. The vehicle 104 may include an autonomous or semi-autonomous vehicle with a vehicle computing system 126 configured to receive guidance from the computing device 110. In some instances, the vehicle computing system 126 associated with the vehicle 104 may receive sensor data from one or more sensors, such as sensor system 122 disposed in, on, or otherwise associated with the vehicle 104. In some examples, the sensor system 122 may include sensors mounted on the autonomous vehicle 104, and include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like. In some examples, the sensor system 122 may include one or more remote sensors, such as, for example sensors mounted on another autonomous vehicle, and/or sensors mounted in the environment. In some examples, the computing system 126 of the vehicle 104 may be configured to detect one or more feature(s) 106 of the environment 102 using sensor data from sensor systems 122. Additionally, or alternatively, the computing system 126 may determine, based on the sensor data, that an event associated with the vehicle is occurring in the environment 102 and/or is predicted to occur. In response to detecting the event and/or feature(s) 106, the vehicle computing system 126 may automatically connect to the remote computing device 110 configured with user interface 112.

The computing device 110 may comprise the user interface 112 and guidance component 114. In various examples, upon detecting a feature 106 and/or event associated with the environment 102, the computing system 126 may send a request for guidance to the computing device 110, where a user associated with the computing device 110 may provide guidance and/or other input for the vehicle 104 via guidance component 114. Additionally, or alternatively, the user associated with the computing device 110 may continuously monitor the vehicle 104 and provide guidance and/or other input for the vehicle 104 on an as-needed basis. The vehicle 104 may communicate with the computing device 110 over one or more network(s) 116. The network(s) 116 may include public networks such as the internet, private networks such as institutional and/or personal network, or some combination of public and private networks. The network(s) 116 may also include any type of wired and/or wireless network, including but not limited to satellite networks, cable networks, Wi-Fi networks, WiMax networks, mobile communications networks (e.g., 3G, 4G, 5G, etc.), local area networks (LAN), wide area networks (WAN), or any combination thereof.

The computing device 110 may be configured to generate a representation (environment representation 108) of the environment 102 through which the vehicle 104 is traversing (e.g., a model, simulation, estimated state, and the like) based at least in part on the sensor data received from the sensor system 122. Additionally, or alternatively, the computing system 126 associated with the vehicle 104 may be configured to generate the environment representation 108 through which the vehicle is traversing based at least in part on the sensor data. In some examples, the environment representation 108 may include a three-dimensional (3D) representation of the environment 102 and/or a 360-degree video of the environment 102, including video images of objects depicted therein, though any other representation is contemplated (e.g., including showing, on a screen, a portion of the data associated with a gaze, head-tracking, gesture, etc.). In some examples, sensor data from the sensor system 122, such as camera data, may be positioned so as to capture a portion of the vehicle 104. In this example, the portion of the vehicle 104 may be included in the 3D representation of the environment 102 and/or the 360-degree video of the environment 102 such that the user associated with the computing device 110 may use the portion of the vehicle 104 as a frame of reference for the user's own orientation.

Additionally, or alternatively, the computing device 110 through which the user interface 112 may display the environment representation 108 may be coupled to a wearable, or head-mounted device, such as user device 120(1), and/or a screen, such as user device 120(2). In some instances, a user device such as user device 120(2) may be associated with, or communicatively coupled to, a sensor 130. The sensor 130 may include a camera, motion detector, lidar, radar, time of flight, infrared, and/or the like. By way of example, the sensor 130 may be a depth-sensing camera and/or fiducial tracking camera and may be configured to detect natural user inputs. The sensor 130 may be disposed in, on, or otherwise associated with the user device 120(2). User device 120 may comprise any type of computing device configured to communicate over network(s) 116, such as mobile phones, tablets, laptop computers, desktop computers, televisions, servers, and/or any other type of computing device. Additionally, or alternatively, user device 120 may be any combination of different types of computing devices, such as user device 120(2), that may be used in combination with head-mounted device, such as user device 120(1), such that the environment representation 108 may be a virtual and/or augmented representation of the environment 102.

The environment representation 108 may also include computer-generated depictions of one or more features, such as feature 106, of the environment 102 through which the vehicle 104 is traversing (e.g., vehicles, pedestrians, buildings, lanes, intersections, signs, street lights, and other features and/or objects). Such depictions may, in some examples, comprise bounding boxes, artist renderings, meshes, or the like. In some examples, the computing device 110 may be configured to selectively toggle between a video representation of the environment 102 and the computer-generated representation of the environment 102, while in some examples the computing device 110 may be configured to overlay computer-generated images or other data on the video representation of the environment 102. In some examples, the environment representation 108 may be from the perspective of the vehicle 104 (e.g., panoptic) or a top-down perspective. In some examples, a user may toggle between the vehicle perspective and the top-down perspective. A user interface 112 of the computing device 110 may be configured to output the environment representation 108 of the vehicle. The user interface 112 may include streaming images captured by a camera from sensor systems 122 on the vehicle 104. In some instances, the representation may be communicated to a user associated with (e.g., using, wearing, etc.) the computing device 110. In some instances, the user may be a remote operator of a remote location 128, such as a remote operations service for a fleet of autonomous vehicles, where the remote operator is trained to guide vehicles remotely. This way, the environment representation 108 communicated to the user via the user device 120 may be assessed by the user to provide guidance and/or other input for the vehicle.

The sensor data may also be used to generate semantic data associated with one or more features 106 of the environment. In some instances, the sensor data may be used by the vehicle in order to detect and/or classify objects (e.g., other vehicles, pedestrians, emergency personnel, lanes, buildings, intersections, etc.). In the environment representation, the detected and/or classified objects may be labeled based on semantic data and the labels may be continuously or selectively displayed in association with some objects (e.g., selected classifications of objects) or all objects. By way of example, and not limitation, the semantic data may include the distance at which a feature 106 is positioned away from the position of the vehicle 104. Additionally, or alternatively, the semantic data may include characteristics associated with the features 106 in the environment 102 (e.g., classification (car, truck, pedestrian, etc.), state (moving, stationary, red, yellow, green, etc.), or otherwise). In some instances, the computing device 110 may be configured to use the semantic data in order to display semantic information in the environment representation 108 that is displayed to the user associated with the computing device 110. For example, the semantic information may be displayed as a "label" for one or more features 106 in the environment representation 108. For example, each feature 106 in the environment representation 108 may be labeled, and/or augmented, with semantic information, such as the distance at which the feature 106 is positioned away from the position of the vehicle 104. Additionally, or alternatively, the computing system 126 associated with the vehicle 104 may be configured to use the semantic data in order to identify the roles, or identities, of a feature 106 in the environment 102, such as a pedestrian, emergency personnel, and/or the like. The computing device 110 may display the semantic information such as roles (fireman, police officer, driver, pedestrian, etc.), or identities (Cpt. Smith, Lt. Jones, etc.), as a label for one or more features 106 in the environment representation 108.

In some instances, the computing device 110 may be configured to receive user input by tracking natural user input associated with the user of the user device 120 with respect to the environment representation 108. For example, the user may perform a natural user input (e.g., head movement, eye movement, hand movement, etc.) that may be directed toward a feature 106 in the environment representation 108 (e.g., head movement, hand gesture, and/or eye gaze toward a person in the environment representation, a hand gesture identifying a location in the environment, etc.). In some instances, user device(s) 120 may be configured with an array of sensors for tracking natural user input (e.g., inertial sensors, camera sensors, and/or the like). Based on the user input, the computing device 110 coupled with the user device 120 may be configured to determine an indication of the feature 106 in the environment representation. By way of example and not limitation, the computing device 110 may determine, based on the duration at which a user directs their eye gaze at a feature 106 in the environment representation 108, an indication of the feature 106 in the environment representation 108. In another non-limiting example, the computing device 110 may determine, based on the duration at which a user directs their head at a feature 106 in the environment representation 108, an indication of the feature 106 in the environment representation 108. Additionally, or alternatively, the computing device 110 may be configured to determine an indication of a feature in the environment representation 108, where the feature may be a waypoint which may be provided as guidance to the vehicle 104 to assist the vehicle in planning a path to traverse a portion of the environment, as discussed in more detail below with respect to FIG. 4.

Upon the determination of an indication of a feature 106 in the environment representation 108, the computing device

110 may use, and/or work in combination with, a guidance component 114 to determine guidance and/or other input associated with the feature 106 that may be performed by the vehicle 104. In some instances, the action may include actuating one or more components associated with the vehicle 104. For example, as discussed in more detail with respect to FIG. 3, the action may include the output of audio at one or more speakers of the vehicle 104, or activation of a visual indicator (e.g., light, display screen, etc.). In another example, as discussed in more detail with respect to FIG. 4, the action may include a suggested trajectory path and/or waypoint(s) to be provided as guidance to the vehicle. Additionally, or alternatively, the action may include an adjustment of temperature in the vehicle 104, the opening of a door of the vehicle 104, changing lighting, music, sounds, suspension, and/or the like. By way of example, and not limitation, based on the location of the feature 106 in the environment representation 108, the computing device 110 may determine which door(s) to cause to open (e.g., the door(s) with the closest proximity to the feature 106 in the environment representation 108 indicated by the user). Additionally, or alternatively, the user may perform a natural user input that may be directed toward the feature 106 in the environment representation 108, where the feature 106 in the environment representation 108 is a door of the vehicle 104. Based on the indication of the door of the vehicle 104 in the environment representation 108, the computing device 110 may cause display of a group of candidate actions associated with the door (e.g., open, close, etc.) as user interface components, such as controls 118. The user may then interact with the controls 118 so as to send an instruction to open and/or close the door of the vehicle 104. The guidance component 114 of the computing device 110 may determine one or more candidate actions based on the indication of the feature 106 in the environment representation 108 indicated by the user, and may cause a group of candidate actions to be displayed at the user interface 112 as one or more user interface components, such as controls 118(1), 118(2), 118(3), and/or 118(N) (where "N" is any integer greater than one). A user may interact with the controls 118 of the user interface 112 to generate an input so as to send an instruction to the vehicle to perform an action. For example, the user may interact with the controls 118 of the user interface 112 by selecting a control with touch (e.g., via a touchscreen or cursor), such as a user of user device 120(2). Additionally, or alternatively, the computing device 110 may be configured to further track natural user input associated with the user device 120(1) and/or 120(2), such as head motions, hand gestures, and/or eye gaze movement, to identify a selection of an action. Continuing from the example above, the user may indicate a feature 106 in the environment representation 108 based on head motion and/or eye gaze movement where the user looks at the feature 106, where the feature 106 is emergency personnel (e.g., a police officer). Based on this indication, the computing device 110 may display, at the user interface 112, one or more candidate actions that may be performed with respect to the police officer. For example, the action may include the output of an audio message at emitter(s) 124, where the audio message indicates that there is an emergency associated with the vehicle.

Figure 2:
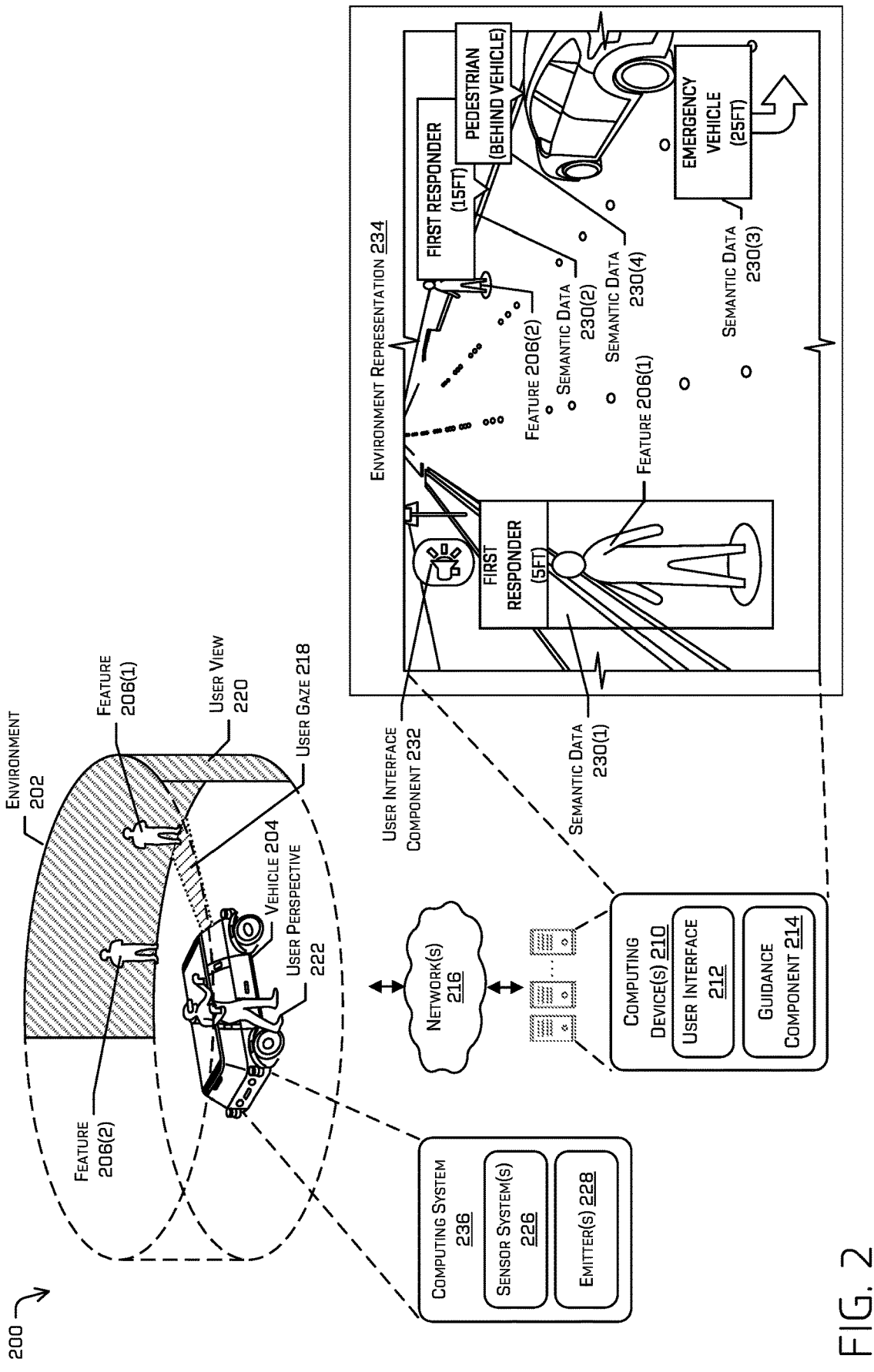
FIG. 2 is an illustration of an example of generating a user interface of a remote computing device showing an example representation of a vehicle traversing an environment, according to at least some examples.

FIG. 2 is an illustration of an example environment 200 for generating a user interface 212 of a computing device 210 showing an example representation of a vehicle traversing an environment (environment representation 234) and displaying semantic data 230, according to at least some examples.

As depicted in FIG. 2, a computing device 110 may receive sensor data from a vehicle 204 traversing an environment 202, where the vehicle 204 may be associated with a computing system 236 configured to receive guidance from the computing device 210. In some instances, the computing system 236 associated with the vehicle 204 may receive sensor data from one or more sensors, such as sensor system 226 disposed in, on, or otherwise associated with the vehicle 204. In some examples, the computing system 236 of the vehicle 204 may be configured to detect one or more feature(s) 206 of the environment 202 using sensor data from sensor systems 226, such as feature 206(1) and/or feature 206(2). Additionally, or alternatively, the computing system 236 may determine, based on the sensor data, that an event associated with the vehicle 204 is occurring in the environment 202 and/or is predicted to occur. In some examples, the event associated with the vehicle 204 may be an emergency event, such as the vehicle 204 becoming stuck. In response to detecting the event and/or features 206, the computing system 236 may automatically connect to the computing device 210 configured with user interface 212.

The computing device 210 may comprise the user interface 212 and guidance component 214. In various examples, upon detecting feature 206(1) and/or 206(2), and/or an event associated with the environment 202, the computing system 236 may send a request for guidance to the computing device 210, where a user associated with the computing device 210 may provide guidance and/or other input for the vehicle 204 via guidance component 214. Additionally, or alternatively, the user associated with the computing device 210 may continuously monitor the vehicle 204 via user interface 212 and provide guidance and/or other input for the vehicle 204 on an as-needed basis. The vehicle 204 may communicate with the computing device 210 over one or more network(s) 216. The network(s) 216 may include public networks such as the internet, private networks such as institutional and/or personal network, or some combination of public and private networks. The network(s) 216 may also include any type of wired and/or wireless network, including but not limited to satellite networks, cable networks, Wi-Fi networks, WiMax networks, mobile communications networks (e.g., 3G, 4G, 5G, etc.), local area networks (LAN), wide area networks (WAN), or any combination thereof.

The computing device 210 may be configured to generate a representation (environment representation 234) of the environment 202 through which the vehicle 204 is traversing (e.g., a model, simulation, estimated state, and the like) based at least in part on the sensor data received from the sensor system 226. Additionally, or alternatively, the computing system 236 associated with the vehicle 204 may be configured to generate the environment representation 234 through which the vehicle is traversing based at least in part on the sensor data. In some examples, the environment representation 234 may include a three-dimensional (3D) representation of the environment 202 and/or a 360-degree video of the environment 202, including video images of objects depicted therein. In some examples, sensor data from the sensor system 226, such as camera data, may be positioned so as to capture a portion of the vehicle 204. In this example, the portion of the vehicle 204 may be included in the 3D representation of the environment 202 and/or the 360-degree video of the environment 202 such that the user associated with the computing device 210 may use the portion of the vehicle 204 as a frame of reference for the user's own orientation.

Additionally, or alternatively, the computing device 210 through which the user interface 212 may display the environment representation 234 may be coupled to a wearable user device that may be used by a user, such as a remote operator. The user device may comprise any type of computing device configured to communicate over network(s) 216, such as mobile phones, tablets, laptop computers, desktop computers, televisions, servers, and/or any other type of computing device.

The environment representation 234 may also include computer-generated depictions of one or more features, such as feature 206(1) and/or 206(2), of the environment 202 through which the vehicle 204 is traversing (e.g., vehicles, pedestrians, buildings, lanes, intersections, signs, street lights, and other features and/or objects). For example, the environment representation 234 may include a feature 206(1) that is a person in the environment 202 and or a feature 206(2) that is a different person in the environment 202. A user interface 212 of the computing device 210 may be configured to output the environment representation 234 of the vehicle. The user interface 212 may include streaming images captured by a camera from sensor systems 226 on the vehicle 204. In some instances, the representation may be communicated to a user associated with (e.g., using, wearing, etc.) the computing device 210. In some instances, the user may be a remote operator of a remote location, such as a remote operations service for a fleet of autonomous vehicles, where the remote operator is trained to guide vehicles remotely. This way, the environment representation 234 communicated to the user such that the user may assess the environment representation 234 and provide guidance and/or other input for the vehicle.

In some instances, the environment representation 234 may be presented to the user, such as a remote operator, based on the user view 220. For example, the computing device 210 may be coupled with a user device, such as user devices 120(1) and/or 120(2), where the user device is configured to track natural user input associated with the user of the user device with respect to the environment representation 234. For example, the head movement of the user may be tracked in the environment representation 234, may correspond to a user view 220 in the direction of the features 206(1) and/or 206(2) in the environment 202, from the user perspective 222. Additionally, or alternatively, user gaze may be tracked in the environment representation 234 and may correspond to a user gaze 218 in the direction of feature 206(1), from the user perspective 222 in the environment 202.

The sensor data received by the vehicle 204 from sensor system 226 may be used to generate semantic data associated with one or more features 206 of the environment 202 by the vehicle 204 and/or the computing device 210. In some instances, the sensor data may be used by the vehicle in order to detect and/or classify objects (e.g., other vehicles, pedestrians, emergency personnel, lanes, buildings, intersections, etc.). In the environment representation 234, the detected and/or classified objects may be labeled based on semantic data. By way of example, and not limitation, the semantic data may include the distance at which a feature 206(1) is positioned away from the position of the vehicle 204. For example, the feature 206(1) may be five feet away from the vehicle 204. Additionally, or alternatively, the feature 206(2) may be 15 feet away from the vehicle 204. In some instances, the computing device 210 may be configured to use the semantic data in order to display semantic information in the environment representation 234 that is displayed at a user interface 212 and to a user associated with the computing device 210. For example, the semantic data 230(1) and 230(2) may be displayed as a "label" for the features 206(1) and/or 206(2), respectively. As such, the feature 206(1) and 206(2), as represented in the environment representation 234, may be labeled with their respective distances and/or other semantic information. The semantic data may also include characteristics associated with the features 206 in the environment 202. The computing system 236 associated with the vehicle 204 may be configured to use the semantic data in order to identify the roles, or identities, of features 206 in the environment 202, such as a pedestrian, emergency personnel, and/or the like. For example, the computing system 236, may determine, based on the sensor data from sensor system 226, that the feature 206(1) and the feature 206(1) and first responders. Accordingly, the computing device 210 may display, at the user interface 212 depicting the environment representation 234, the semantic data 230(1) and 230(2) labeled the features 206(1) and 206(2) as first responders. In some instances, semantic data may be used by the computing system 236 and/or guidance component 214 of the computing device 210 in determining an action to be performed by the vehicle 204. For example, semantic data indicating that a feature of the environment 202 is a construction worker may cause a change in trajectory associated with the vehicle 204 (e.g., because of a presumption that a construction worker is not actively moving.) Additionally, or alternatively, semantic data indicating that a feature of the environment 202 is a pedestrian may cause the vehicle 204 to stop (e.g., because of a presumption that a pedestrian is likely to move).

Continuing from the example above, in some instances the environment representation 234 may be presented to a user based on user view 220. Additionally, or alternatively, the sensor data received from the sensor system 226 may be used to generate semantic data associated with features of the environment 202 that may not be within the user view 220. For example, the user view 220 may be based on the user looking in a northern direction, and there may be features of the environment 202 that are in the southern direction of the user, and thus, out of the user view 220. Accordingly, the sensor data may be used by the vehicle 204 in order to detect and/or classify objects that are not within the user view 220 (i.e., are "off-screen."). In the environment representation 234, the detected and/or classified objects outside of the user view 220 may be labeled based on semantic data. By way of example, and not limitation, the semantic data may include semantic data 230(3), which may include the distance and direction at which a feature outside of user view 220 may be positioned. As illustrated, semantic data 230(3) may include an indication of an emergency vehicle that is to the right of the user view 220, and may indicate that the emergency vehicle is 25 feet away. Example techniques for generating off-screen indicators can be found, for example, in U.S. Pat. No. 11,753,029, issued Sep. 12, 2023, and titled "Off-Screen Object Indications for a Vehicle User Interface," the contents of which is herein incorporated by reference in its entirety for all purposes.

Additionally, or alternatively, the sensor data received from the sensor system 226 may be used to generate semantic data associated with features of the environment 202 that may be within the user view 220, but may be obstructed by another feature of the environment 202. For example, the user view 220 may include multiple features in the environment 202, some of which may be obstructed by a different feature (e.g., a child behind a vehicle, a dog behind a bush, and/or the like). Accordingly, the sensor data may be used by the vehicle 204 in order to detect and/or classify objects that may be within the user view 220, but are obstructed and/or otherwise not visible. In the environment representation 234, the detected and/or classified objects that may be obstructed may be labeled based on semantic data. By way of example, and not limitation, the semantic data may include semantic data 230(4), which may include an indication of an obstructed feature of the environment 202. As illustrated, semantic data 230(4) may include an indication of a pedestrian that is positioned behind a vehicle, and thus obstructed in the user view 220.

In some instances, the environment representation 234 depicted by the user interface 212 may also include user interface components, such as user interface component 232 that may be associated with one or more features 206. For example, in instances where the user gaze may be tracked in the environment representation 234, and may correspond to a user gaze 218, the computing device 210 may determine an indication of the feature 206(1). Based on the indication, the guidance component 214 of the computing device 210 may determine one or more candidate actions based on the feature 206(1), such as the semantic data 230(1). For example, based on the semantic data 230(1) indicating that the feature 206(1) is a first responder that is five feet away from the vehicle 204, the computing device 210 may cause display of, at the user interface 212 depicting the environment representation 234, a user interface component 232 with an action. As depicted in FIG. 2, the action may be causing the vehicle 204 to output an audio message via emitter(s) 228. For example, in instances where the feature 206(1) is a first responder, the audio message may include an indication of an emergency (e.g., "remote operations is standing by. Two passengers inside the vehicle, both are okay"). Additionally, or alternatively, example audio messages may include "vehicle is about to move, please keep away," and/or "please come closer to the vehicle." By selecting the user interface component 232, the user associated with the computing device 210 may transmit information to the vehicle 204 to cause the action to occur. In some instances, the user may select the user interface component 232 manually at the user interface 212 (e.g., by touchscreen or cursor). Additionally, or alternatively, the user may select the user interface component 232 by further tracking by the computing device 210 of head movement, hand gestures, eye gaze, and the like.

Figure 3:
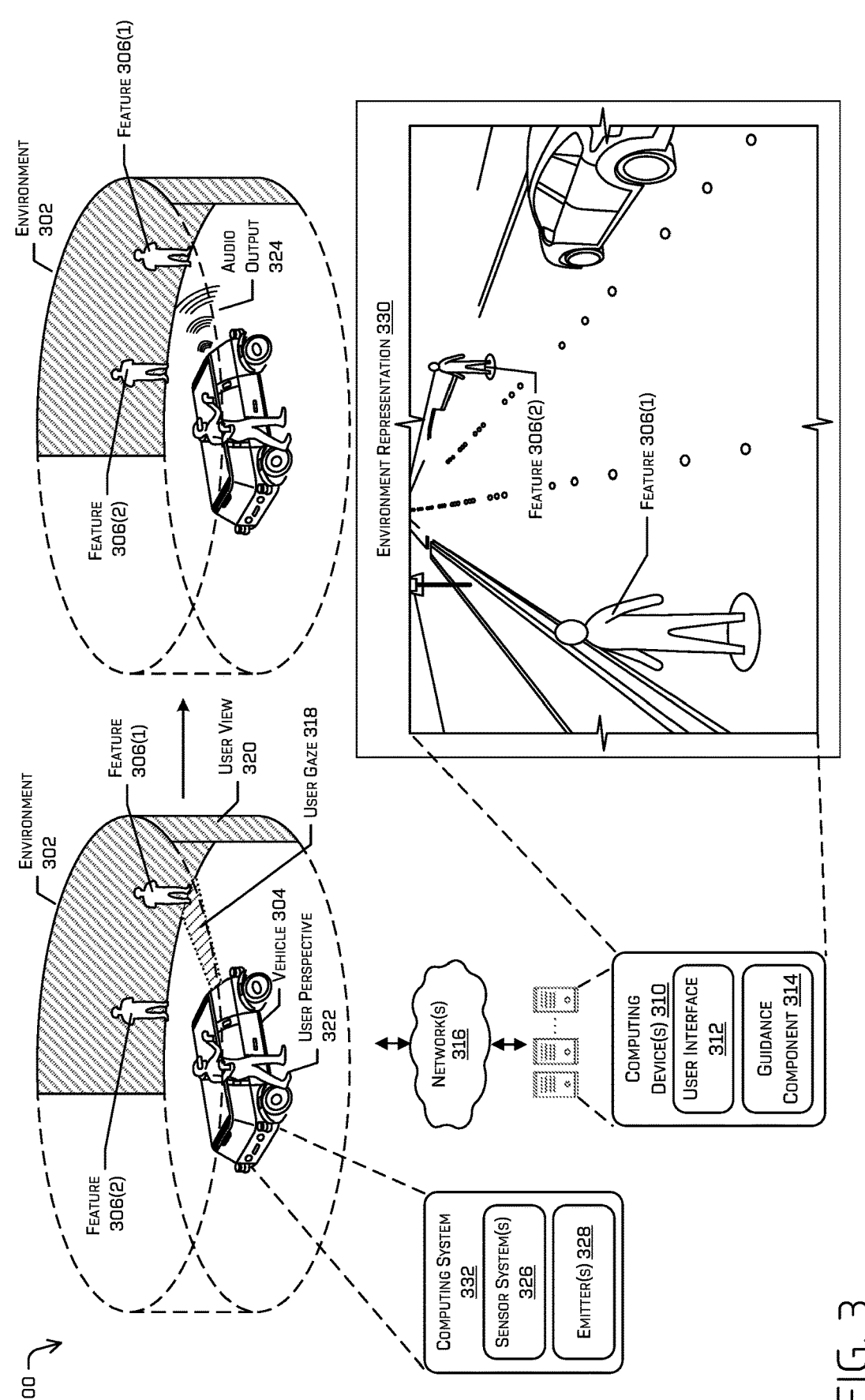
FIG. 3 illustrates another example of generating a user interface of a remote computing device showing an example representation of a vehicle traversing an environment and transmitting information to a vehicle to perform an action associated with the vehicle, such as the output of audio.

FIG. 3 illustrates another example environment 300 for generating a user interface 312 of a computing device 310 showing an example representation of a vehicle 304 traversing an environment 302, and transmitting information to the vehicle 304 via natural user input tracking in order to cause an action associated with the vehicle 304, such as the output of audio.

As depicted in FIG. 3, a computing device 310 may receive sensor data from a vehicle 304 traversing an environment 302, where the vehicle 304 may be associated with a computing system 332 configured to receive guidance from the computing device 310. In some instances, the computing system 332 associated with the vehicle 304 may receive sensor data from one or more sensors, such as sensor system 326 disposed in, on, or otherwise associated with the vehicle 304. In some examples, the computing system 332 of the vehicle 304 may be configured to detect one or more feature(s) 306 of the environment 302 using sensor data from sensor systems 326, such as feature 306(1) and/or feature 306(2). Additionally, or alternatively, the computing system 332 may determine, based on the sensor data, that an event associated with the vehicle 304 is occurring in the environment 302 and/or is predicted to occur. In some examples, the event associated with the vehicle 304 may be an emergency event, such as the vehicle 304 becoming stuck. In response to detecting the event and/or features 306, the computing system 332 may automatically connect to the computing device 310 configured with user interface 312.

The computing device 310 may comprise the user interface 312 and guidance component 314. In various examples, upon detecting feature 306(1) and/or 306(2), and/or an event associated with the environment 302, the computing system 332 may send a request for guidance to the computing device 310, where a user associated with the computing device 310 may provide guidance and/or other input for the vehicle 304 via guidance component 314. Additionally, or alternatively, the user associated with the computing device 310 may continuously monitor the vehicle 304 via user interface 312 and provide guidance and/or other input for the vehicle 304 on an as-needed basis. The vehicle 304 may communicate with the computing device 310 over one or more network(s) 316. The network(s) 316 may include public networks such as the internet, private networks such as institutional and/or personal network, or some combination of public and private networks. The network(s) 316 may also include any type of wired and/or wireless network, including but not limited to satellite networks, cable networks, Wi-Fi networks, WiMax networks, mobile communications networks (e.g., 3G, 4G, 5G, etc.), local area networks (LAN), wide area networks (WAN), or any combination thereof.

The computing device 310 may be configured to generate a representation (environment representation 330) of the environment 302 through which the vehicle 304 is traversing (e.g., a model, simulation, estimated state, and the like) based at least in part on the sensor data received from the sensor system 326. Additionally, or alternatively, the computing system 332 associated with the vehicle 304 may be configured to generate the environment representation 330 through which the vehicle is traversing based at least in part on the sensor data. In some examples, the environment representation 330 may include a three-dimensional (3D) representation of the environment 302 and/or a 360-degree video of the environment 302. Additionally, or alternatively, the computing device 310 through which the user interface 312 may display the environment representation 330 may be coupled to a wearable user device that may be used by a user, such as a remote operator. The user device may comprise any type of computing device configured to communicate over network(s) 316, such as mobile phones, tablets, laptop computers, desktop computers, televisions, servers, and/or any other type of computing device.

The environment representation 330 may also include computer-generated depictions a of one or more features, such as feature 306(1) and/or 306(2), of the environment 302 through which the vehicle 304 is traversing (e.g., vehicles, pedestrians, buildings, lanes, intersections, signs, street lights, and other features and/or objects). For example, the environment representation 330 may include a feature 306 (1) that is a person in the environment 302 and or a feature 306(2) that is a different person in the environment 302. A user interface 312 of the computing device 310 may be configured to output the environment representation 330 of the vehicle 304. The user interface 312 may include streaming images captured by a camera from sensor systems 326 on the vehicle 304. In some instances, the representation may be communicated to a user associated with (e.g., using, wearing, etc.) the computing device 310. In some instances, the user may be a remote operator of a remote location, such as a remote operations service for a fleet of autonomous vehicles, where the remote operator is trained to guide vehicles remotely. This way, the environment representation 330 communicated to the user such that the user may assess the environment representation 330 and provide guidance and/or other input for the vehicle.

In some instances, the environment representation 330 may be presented to the user, such as a remote operator, based on the user view 320. For example, the computing device 310 may be coupled with a user device, such as user devices 120(1) and/or 120(2), where the user device is configured to track natural user input associated with the user of the user device with respect to the environment representation 330 (e.g., head movement, hand gestures, eye movement, etc.). For example, the head movement of the user may be tracked in the environment representation 330, may correspond to a user view 320 in the direction of the features 306(1) and/or 306(2) in the environment 302, from the user perspective 322. Additionally, or alternatively, user gaze may be tracked in the environment representation 330, and may correspond to a user gaze 318 in the direction of feature 306(1), from the user perspective 322 in the environment 302.

For example, in instances where the user gaze may be tracked in the environment representation 330, and may correspond to a user gaze 318, the computing device 310 may determine an indication of the feature 306(1). Based on the indication, the guidance component 314 of the computing device 310 may determine one or more actions that may be performed by the vehicle 304, such as the output of audio (audio output 324) in the direction of feature 306(1) via emitter(s) 328. As described above with respect to FIG. 2, the environment representation 330 may include a user interface component that enables the user associated with the computing device 310 to transmit information to the vehicle 304 to cause an action associated with the vehicle 304, such as audio output 324. In some instances, the user may select the user interface component manually at the user interface 312 (e.g., by touchscreen or cursor). Additionally, or alternatively, the user may select the user interface component by further tracking by the computing device 310 of head movement, hand gestures, eye gaze, and the like.

Continuing from the example above, computing device 310 may use, or work in combination with, the guidance component 314 to identify, and subsequently cause, an action to be performed by the vehicle 304 based on tracking user natural user input, such as user gaze 318. In examples where the action to be performed by the vehicle includes audio output 324, the computing device 310 may determine one or more audio messages to be output via emitters 328 of the vehicle 304. For instance, the computing device 310 may determine one or more audio messages based on characteristics associated with the feature 306(1) indicated by user gaze 318. For example, audio messages for first responders may be different than audio messages for pedestrians. Additionally, or alternatively, the computing devices 310 may determine the one or more audio messages based on the environment 302 and events detected and/or predicted by the computing system 332. Further, the computing device 310 may be configured to determine volumes associated with the audio messages based on characteristics associated with the feature 306(1) indicated by the user gaze 318. For example, the volume of audio output 324 directed to feature 306(1) may be less than the volume of audio output if the user gaze 318 had indicated feature 3069(2) in the environment representation 330.

In some instances, the computing device 310 may determine an emitter 328 from multiple emitters 328 to output the audio output 324. For example, the vehicle 304 may be equipped with multiple emitters 328, such as speakers or other audio output devices. By way of example, and not limitation, the vehicle 304 may include an emitter 328 as each corner of the vehicle. Accordingly, using the sensor data from sensor systems 326 and based on the location of the feature 306(1) indicated by the user gaze 318, the computing device 310 may identify an emitter 328 from the multiple emitters 328 that is in closest proximity to the feature 306(1), and may send instructions to the vehicle 304 to cause the audio output 324 to be performed at that identified emitter 328. Additionally, or alternatively, the computing device 310 may determine an indication of the feature 306(2). Accordingly, using the sensor data from the sensor systems 326 and based on the location of the feature 306(2) indicated by the user gaze 318, the computing device 310 may identify an emitter 328 from the multiple emitters 328 that is in closest proximity to the feature 306(2), and may send instructions to the vehicle 304 to cause audio output to be performed at that identified emitter 328. Additionally, or alternatively, sensor system 326 may also include one or more microphones. Upon the causing of audio output 324 to be performed, the computing device 310 may receive audio data of the environment 302 from the computing system 332 and cause a speaker of a user device coupled to the computing device 310 to contemporaneously emit audio output 324. This way, a user, such as a remote operator, associated with the user device may be made aware of that the audio output 324 was performed.

Figure 4:
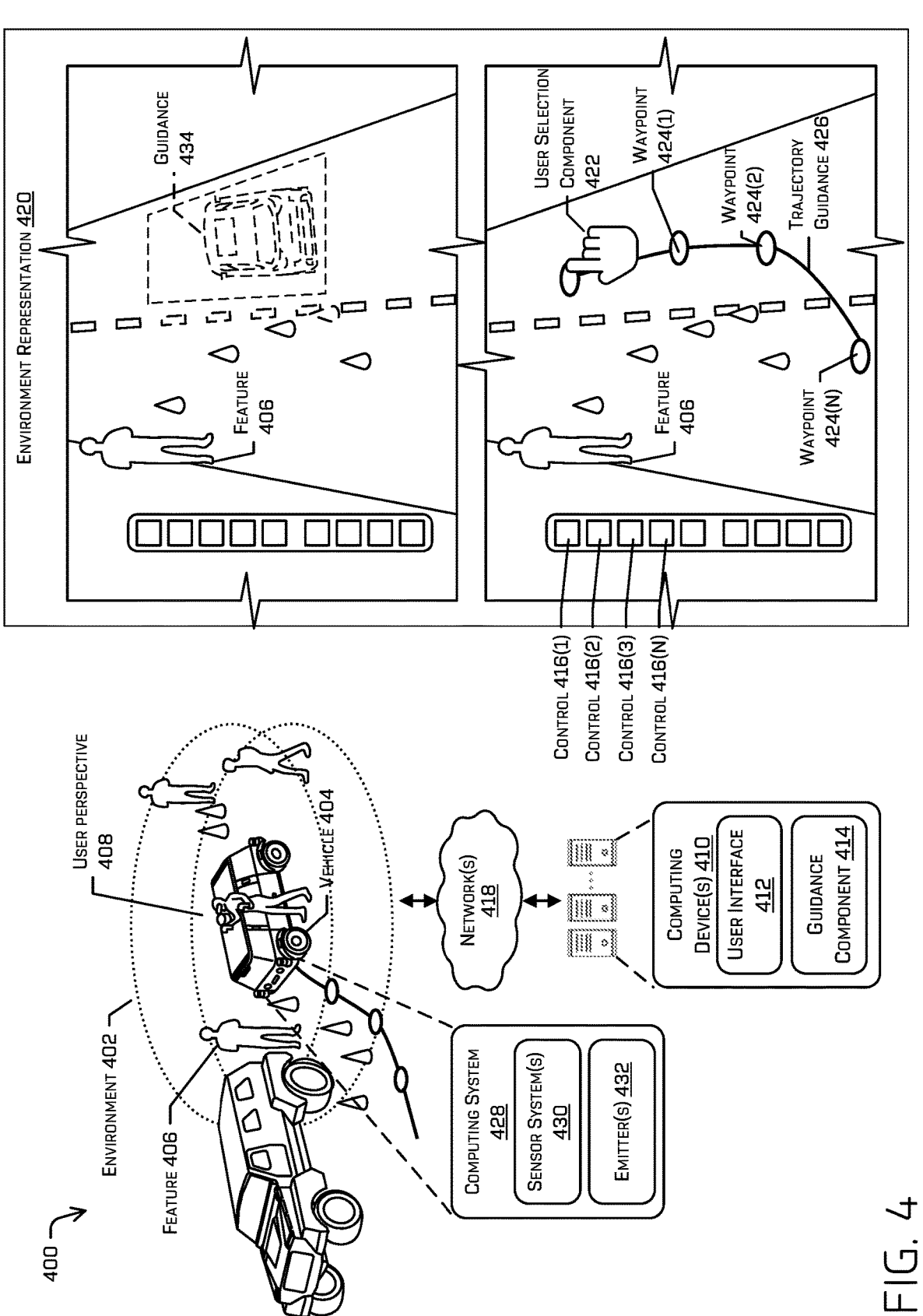
FIG. 4 illustrates yet another example user interface of a remote computing device showing an example representation of a vehicle traversing an environment, and providing vehicle guidance, according to at least some examples.

FIG. 4 illustrates yet another example of an environment 400 and generating a user interface 412 of a computing device 410 showing an example representation of a vehicle 404 traversing an environment 402, and providing vehicle guidance via natural user input tracking.

As depicted in FIG. 4, a computing device 410 may receive sensor data from a vehicle 404 traversing an environment 402, where the vehicle 404 may be associated with a computing system 428 configured to receive guidance from the computing device 410. In some instances, the computing system 428 associated with the vehicle 404 may receive sensor data from one or more sensors, such as sensor system 430 disposed in, on, or otherwise associated with the vehicle 404. In some examples, the computing system 428 of the vehicle 404 may be configured to detect one or more feature(s) 406 of the environment 402 using sensor data from sensor systems 430. Additionally, or alternatively, the computing system 428 may determine, based on the sensor data, that an event associated with the vehicle 404 is occurring in the environment 402 and/or predicted to occur. In some examples, the event associated with the vehicle 404 may be an emergency event, such as the vehicle 304 becoming stuck. As depicted in FIG. 4, the event associated with the vehicle 404 may be a road obstruction, such as a blocked lane. In response to detecting the event and/or features 406, the computing system 428 may automatically connect to the computing device 410 configured with user interface 412.

The computing device 410 may comprise the user interface 412 and guidance component 414. In various examples, upon detecting feature 406 and/or an event associated with the environment 402, the computing system 428 may send a request for guidance to the computing device 410, where a user associated with the computing device 410 may provide guidance and/or other input for the vehicle 404 via guidance component 414. Additionally, or alternatively, the user associated with the computing device 410 may continuously monitor the vehicle 404 via user interface 412 and provide guidance and/or other input for the vehicle 404 on an as-needed basis. The vehicle 404 may communicate with the computing device 410 over one or more network(s) 418. The network(s) 418 may include public networks such as the internet, private networks such as institutional and/or personal network, or some combination of public and private networks. The network(s) 418 may also include any type of wired and/or wireless network, including but not limited to satellite networks, cable networks, Wi-Fi networks, WiMax networks, mobile communications networks (e.g., 3G, 4G, 5G, etc.), local area networks (LAN), wide area networks (WAN), or any combination thereof.

The computing device 410 may be configured to generate a representation (environment representation 420) of the environment 402 through which the vehicle 404 is traversing (e.g., a model, simulation, estimated state, and the like) based at least in part on the sensor data received from the sensor system 430. Additionally, or alternatively, the computing system 428 associated with the vehicle 404 may be configured to generate the environment representation 420 through which the vehicle is traversing based at least in part on the sensor data. In some examples, the environment representation 420 may include a three-dimensional (3D) representation of the environment 402 and/or a 360-degree video of the environment 402. The environment representation 420 may also be displayed at the user interface 412 from a perspective such as user perspective 408. Additionally, or alternatively, the computing device 410 through which the user interface 412 may display the environment representation 420 may be coupled to a wearable user device that may be used by a user, such as a remote operator. The user device may comprise any type of computing device configured to communicate over network(s) 418, such as mobile phones, tablets, laptop computers, desktop computers, televisions, servers, and/or any other type of computing device. The environment representation 420 may also include computer-generated depictions of one or more features, such as feature 406, of the environment 402 through which the vehicle 404 is traversing (e.g., vehicles, pedestrians, buildings, lanes, intersections, signs, street lights, and other features and/or objects). For example, the environment representation 420 may include a feature 406 that is an obstruction in the environment 402. A user interface 412 of the computing device 410 may be configured to output the environment representation 420 of the vehicle 404. The user interface 412 may include streaming images captured by a camera from sensor systems 430 on the vehicle 404. In some instances, the representation may be communicated to a user associated with (e.g., using, wearing, etc.) the computing device 410. In some instances, the user may be a remote operator of a remote location, such as a remote operations service for a fleet of autonomous vehicles, where the remote operator is trained to guide vehicles remotely. This way, the environment representation 420 communicated to the user such that the user may assess the environment representation 420 and provide guidance and/or other input for the vehicle. In some examples, the action may include actuating emitter(s) 432 associated with the vehicle 404.

In some examples, while being displayed the environment representation 420, the user associated with the computing device 410 may provide input to the controls 416(1), 416(2), 416(3), and/or 416(N) (where "N" is any integer greater than one) to cause the computing device 410 to provide trajectory guidance 426 to accommodate the feature 406 and assist the vehicle 404 in planning a path to traverse the environment 402. Additionally, or alternatively, the user associated with the computing device 410 may input waypoints 424(1), 424(2), and/or 424(N) (where "N" is any integer greater than one). The waypoints 424 may include locations (e.g., x-, y-, z-position, etc.) over which the vehicle 404 may travel. In scenarios where the user associated with the computing device 410 may select controls 416 and/or place waypoints 424, such as via user selection component 422, the user may manually interact with the user interface with touch (e.g., via a touchscreen or cursor). Additionally, or alternatively, the computing device 410 may be configured to track natural user input associated with the user of the computing device 410, such as head motions, hand gestures, and/or eye gaze movement, to identify the selection of one or more controls 416 and/or waypoints 424.

Additionally, or alternatively, the user associated with the computing device 410 may provide input to cause the computing device 410 to provide guidance to the vehicle 404 in planning a path to traverse the environment. For example, the natural user input may indicate guidance 434, such that a pull-over location footprint (e.g., x-, y-, z-position, etc.) and/or vehicle pose (e.g., the orientation of the vehicle, the position of the vehicle, etc.) may be communicated to the vehicle 404. The vehicle 404 may plan a path to the pull-over location footprint, drive to the pull-over location footprint, and stop at that location. Example techniques for outputting immersive spatial audio can be found, for example, in U.S. Patent Pub. No. 2023/0060435 filed Aug. 31, 2021, and titled "Remote Assistance for Vehicles," the contents of which is herein incorporated by reference in its entirety for all purposes. Additionally, or alternatively, the natural user input may indicate a "reverse nudge" and/or a "forward nudge" which may be communicated to the vehicle 404, where the vehicle 404 may plan a trajectory based on the reverse nudge and/or forward nudge. Controls 416(1), 416(2), 416(3), and/or 416(N) may also be used by the user to indicate, via natural user input, the reverse nudge and/or the forward nudge. Example techniques for remotely providing guidance to a vehicle can be found, for example, in U.S. Pat. No. 10,268,191 issued Apr. 23, 2019, and titled "Predictive Teleoperator Situational Awareness," the contents of which is herein incorporated by reference in its entirety for all purposes.

Figure 5:
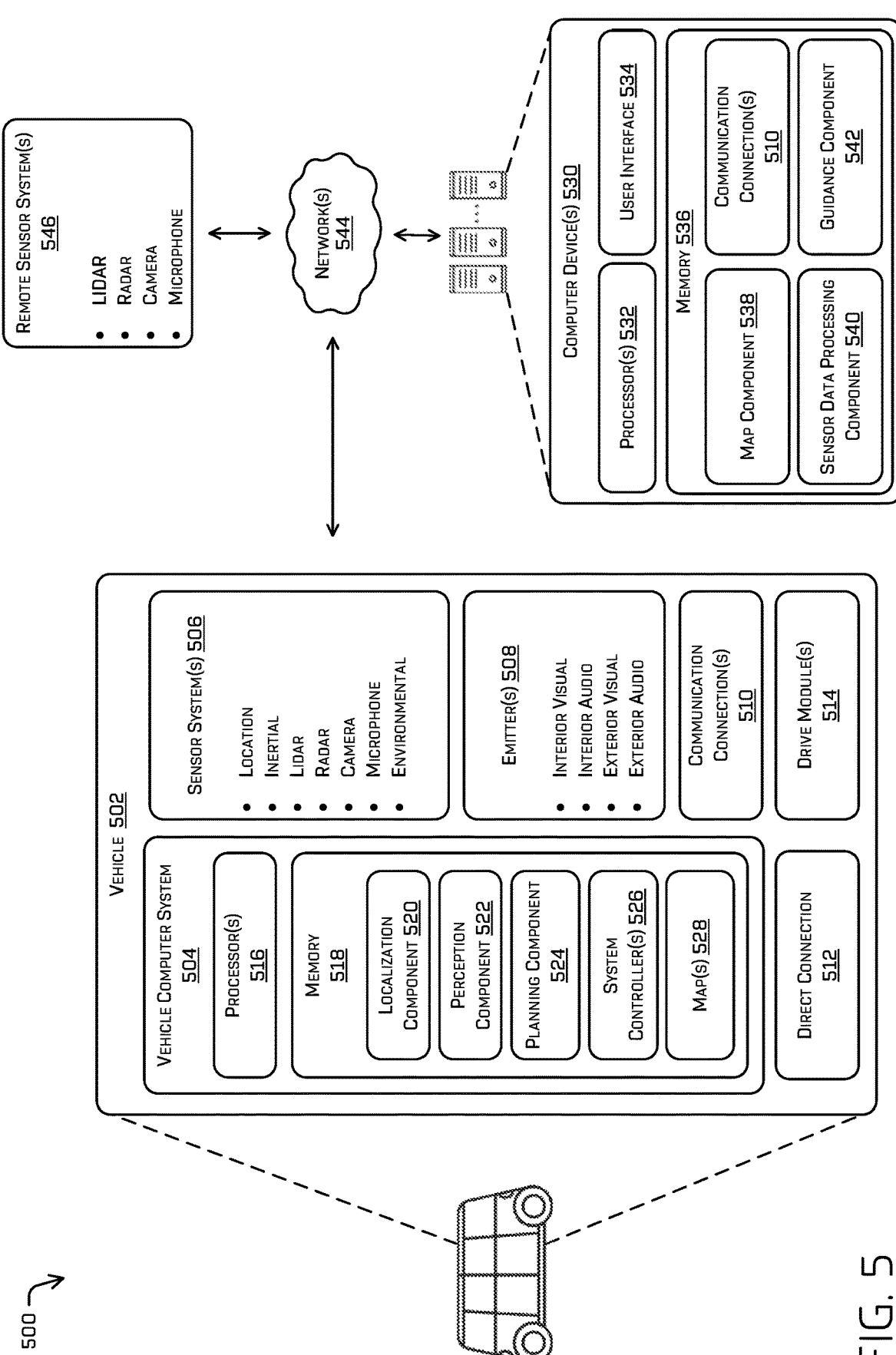
FIG. 5 depicts a block diagram of an example system for implementing the techniques described herein.

FIG. 5 depicts a block diagram of an example system 500 for implementing the techniques described herein. In at least one example, the system 500 may include a vehicle, such as vehicle 502.

The vehicle 502 may include a vehicle computer system 504, one or more sensor systems 506, one or more emitters 508, one or more communication connections 510, at least one direct connection 512, and one or more drive modules 514.

The vehicle computer system 504 may include one or more processors 516 and memory 518 communicatively coupled with the one or more processors 516. In the illustrated example, the vehicle 502 is an autonomous vehicle; however, the vehicle 502 could be any other type of vehicle, such as a semi-autonomous vehicle, or any other system having at least an image capture device (e.g., a camera enabled smartphone). In some instances, the autonomous vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 502 may be a fully or partially autonomous vehicle having any other level or classification.

In various examples, the vehicle computer system 504 may store sensor data associated with actual location of an object at the end of the set of estimated states (e.g., end of the period of time) and use this data as training data to train one or more models. In some examples, the vehicle computer system 504 may provide the data to a remote computer device (i.e., computer device separate from vehicle computer system such as the computer device(s) 530) for data analysis.

In the illustrated example, the memory 518 of the vehicle computer system 504 stores a localization component 520, a perception component 522, a planning component 524, one or more system controllers 526, and one or more maps 528. Though depicted in FIG. 5 as residing in the memory 518 for illustrative purposes, it is contemplated that the localization component 520, the perception component 522, the planning component 524, the one or more system controllers 526, and/or the one or more maps 528 may additionally, or alternatively, be accessible to the vehicle 502 (e.g., stored on, or otherwise accessible by, memory remote from the vehicle 502, such as, for example, on memory 536 of a computer device(s) 530).

In at least one example, the localization component 520 may include functionality to receive data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment, such as from map(s) 528 and/or map component 538 and may continuously determine a location and/or orientation of the autonomous vehicle within the map. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 520 may provide data to various components of the vehicle 502 to determine an initial position of an autonomous vehicle for determining the relevance of an object to the vehicle 502, as discussed herein.

In some instances, the perception component 522 may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.). In additional or alternative examples, the perception component 522 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

In general, the planning component 524 may determine a path for the vehicle 502 to follow to traverse through an environment. For example, the planning component 524 may determine various routes and trajectories and various levels of detail. For example, the planning component 524 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 524 may generate an instruction for guiding the autonomous vehicle along at least a portion of the route from the first location to the second location. In at least one example, the planning component 524 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 502 to navigate.

In some examples, the planning component 524 may include a prediction component to generate predicted trajectories of objects (e.g., objects) in an environment and/or to generate predicted candidate trajectories for the vehicle 502. For example, a prediction component may generate one or more predicted trajectories for objects within a threshold distance from the vehicle 502. In some examples, a prediction component may measure a trace of an object and generate a trajectory for the object based on observed and predicted behavior.

In at least one example, the vehicle computer system 504 may include one or more system controllers 526, which may be configured to control steering, propulsion, braking, safety, emitters, communication, and other systems of the vehicle 502. The system controller(s) 526 may communicate with and/or control corresponding systems of the drive module(s) 514 and/or other components of the vehicle 502.

The memory 518 may further include one or more maps 528 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the map(s) 528. That is, the map(s) 528 may be used in connection with the localization component 520, the perception component 522, and/or the planning component 524 to determine a location of the vehicle 502, detect objects and/or regions in an environment, generate routes, determine actions and/or trajectories to navigate within an environment.

In some examples, the one or more maps 528 may be stored on a remote computer device(s) (such as the computer device(s) 530) accessible via network(s) 544. In some examples, multiple maps 528 may be stored based on, for example, a characteristic (e.g., type of entity, time of day, day of week, season of the year, etc.). Storing multiple maps 528 may have similar memory requirements, but increase the speed at which data in a map may be accessed.

As illustrated in FIG. 5, the computer device(s) 530 may include a guidance component 542. In various examples, the guidance component 542 may receive sensor data associated with the detected object(s) and/or region(s) from the perception component 522 and/or from the sensor system(s) 506. In some examples, the guidance component 542 may receive environment characteristics (e.g., environmental factors, etc.) and/or weather characteristics (e.g., weather factors such as snow, rain, ice, etc.) from the perception component 522 and/or the sensor system(s) 506. The guidance component 542 may be configured to determine a suggested action for the vehicle 502 to perform. While shown separately in FIG. 5, the guidance component 542 could be part of the planning component 524 or another component(s) of the vehicle 502.

In various examples, the guidance component 542 may be configured to receive a user input indicating a feature in the environment of the vehicle 502 based on tracked user gestures. The guidance component 542 may determine a user-selected action associated with feature in the environment, and transmit the action to the vehicle 502 via the network 544. In some examples, the guidance component 542 may be configured to determine one or more available trajectories for the vehicle 502 to follow based on user input, such as waypoints. Additionally, or alternatively the guidance component 542 may be configured to transmit the one or more available trajectories to the vehicle 502 for the vehicle to consider in planning consideration. In some examples, the guidance component 542 may be configured to determine trajectories that are applicable to the environment, such as based on environment characteristics, weather characteristics, or the like.

The guidance component 542 may be configured to control operations of the vehicle 502 such as by receiving input from a remote operator via the user interface. For instance, the remote operator may select a control that implements a planning tool in the user interface that enables planning for the vehicle to be performed automatically by the planning tool and/or manually by a remote operator.

As can be understood, the components discussed herein (e.g., the localization component 520, the perception component 522, the planning component 524, the one or more system controllers 526, the one or more maps 528, the guidance component 542 are described as divided for illustrative purposes. However, the operations performed by the various components may be combined or performed in any other component.

In some instances, aspects of some or all of the components discussed herein may include any models, techniques, and/or machine learned techniques. For example, in some instances, the components in the memory 518 (and the memory 536, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), Ada-Boost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet70, ResNet101, VGG, DenseNet, PointNet, and the like.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computer system 504. Additionally, or in the alternative, the sensor system(s) 506 may send sensor data, via the one or more networks 544, to the one or more computer device(s) 530 at a particular frequency, after a lapse of a predetermined period of time, in near real-time, etc.

The vehicle 502 may also include one or more emitters 508 for emitting light and/or sound. The emitters 508 may include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 may also include one or more communication connections 510 that enable communication between the vehicle 502 and one or more other local or remote computer device(s). For instance, the communication connection(s) 510 may facilitate communication with other local computer device(s) on the vehicle 502 and/or the drive module(s) 514. Also, the communication connection(s) 510 may allow the vehicle to communicate with other nearby computer device(s) (e.g., computer device(s) 530, other nearby vehicles, etc.) and/or one or more remote sensor system(s) 546 for receiving sensor data. The communications connection(s) 510 also enable the vehicle 502 to communicate with a remote operation's computer device or other remote services.

The communications connection(s) 510 may include physical and/or logical interfaces for connecting the vehicle computer system 504 to another computer device or a network, such as network(s) 544. For example, the communications connection(s) 510 can enable Wi-Fi-based communication such as via frequencies defined by the IEEE 502.11 standards, short range wireless frequencies such as Bluetooth, cellular communication (e.g., 2G, 3G, 4G, 4G LTE, 5G, etc.) or any suitable wired or wireless communications protocol that enables the respective computer device to interface with the other computer device(s).

In at least one example, the vehicle 502 may include one or more drive modules 514. In some examples, the vehicle 502 may have a single drive module 514. In at least one example, if the vehicle 502 has multiple drive modules 514, individual drive modules 514 may be positioned on opposite ends of the vehicle 502 (e.g., the front and the rear, etc.). In at least one example, the drive module(s) 514 may include one or more sensor systems to detect conditions of the drive module(s) 514 and/or the surroundings of the vehicle 502. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive module(s) 514. In some cases, the sensor system(s) on the drive module(s) 514 may overlap or supplement corresponding systems of the vehicle 502 (e.g., sensor system(s) 506).

The drive module(s) 514 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 514 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive module(s) 514. Furthermore, the drive module(s) 514 may also include one or more communication connection(s) that enable communication by the respective drive module with one or more other local or remote computer device(s).

In at least one example, the direct connection 512 may provide a physical interface to couple the one or more drive module(s) 514 with the body of the vehicle 502. For example, the direct connection 512 may allow the transfer of energy, fluids, air, data, etc. between the drive module(s) 514 and the vehicle. In some instances, the direct connection 512 may further releasably secure the drive module(s) 514 to the body of the vehicle 502.

In at least one example, the localization component 520, the perception component 522, the planning component 524, the one or more system controllers 526, and the one or more maps 528, may process sensor data, as described above, and may send their respective outputs, over the one or more network(s) 544, to the computer device(s) 530. In at least one example, the localization component 520, the perception component 522, the planning component 524, and the one or more system controllers 526, the one or more maps 528, may send their respective outputs to the computer device(s) 530 at a particular frequency, after a lapse of a predetermined period of time, in near real-time, etc.

In some examples, the vehicle 502 may send sensor data to the computer device(s) 530 via the network(s) 544. In some examples, the vehicle 502 may receive sensor data from the computer device(s) 530 and/or remote sensor system(s) 546 via the network(s) 544. The sensor data may include raw sensor data and/or processed sensor data and/or representations of sensor data. In some examples, the sensor data (raw or processed) may be sent and/or received as one or more log files.

The computer device(s) 530 may include processor(s) 532, a user interface 534, and a memory 536 storing the map component 538, a sensor data processing component 540, and a guidance component 542. In some examples, the map component 538 may include functionality to generate maps of various resolutions. In such examples, the map component 538 may send one or more maps to the vehicle computer system 504 for navigational purposes. In various examples, the sensor data processing component 540 may be configured to receive data from one or more remote sensors, such as sensor system(s) 506 and/or remote sensor system(s) 546. In some examples, the sensor data processing component 540 may be configured to process the data and send processed sensor data to the vehicle computer system 504, such as for use by the planning component 524. In some examples, the sensor data processing component 540 may be configured to send raw sensor data to the vehicle computer system 504.

The processor(s) 516 of the vehicle 502 and the processor(s) 532 of the computer device(s) 530 may be any suitable processor capable of executing instructions to process data and perform operations as described herein. By way of example and not limitation, the processor(s) 516 and 532 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and memory 536 are examples of non-transitory computer-readable media. The memory 518 and memory 536 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 518 and memory 536 may include at least a working memory and a storage memory. For example, the working memory may be a high-speed memory of limited capacity (e.g., cache memory) that is used for storing data to be operated on by the processor(s) 516 and 532. In some instances, the memory 518 and memory 536 may include a storage memory that may be a lower-speed memory of relatively large capacity that is used for long-term storage of data. In some cases, the processor(s) 516 and 532 cannot operate directly on data that is stored in the storage memory, and data may need to be loaded into a working memory for performing operations based on the data, as discussed herein.

It should be noted that while FIG. 5 is illustrated as a distributed system, in alternative examples, components of the vehicle 502 may be associated with the computer device(s) 530 and/or components of the computer device(s) 530 may be associated with the vehicle 502. That is, the vehicle 502 may perform one or more of the functions associated with the computer device(s) 530, and vice versa.

FIG. 6 is a flowchart depicting an example process 600 for transmitting information to a vehicle to perform an action using gesture-tracked remote operations, according to at least some examples.

At block 602, the process 600 may include receiving sensor data from sensor associated with a vehicle traversing an environment. For example, a remote computing device of remote location may receive sensor data from a vehicle traversing an environment. The vehicle may include an autonomous or semi-autonomous vehicle with a vehicle computing system configured to receive guidance from the computing device. In some instances, the vehicle computing system associated with the vehicle may receive sensor data from one or more sensors, such as sensor system associated with the vehicle. In some examples, the sensor system may include sensors mounted on the autonomous vehicle, and include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like. In some examples, the sensor system may include one or more remote sensors, such as, for example sensors mounted on another autonomous vehicle, and/or sensors mounted in the environment. In some examples, the computing system of the vehicle may be configured to detect one or more features of the environment using sensor data from sensor systems. Additionally, or alternatively, the computing system may determine, based on the sensor data, that an event associated with the vehicle is occurring in the environment. In response to detecting the event and/or features, the vehicle computing system may automatically connect to the remote computing device configured with user interface.

At block 604, the process 600 may include causing display of a representation of the environment. For example, the computing device may be configured to generate a representation (environment representation) of the environment through which the vehicle is traversing (e.g., a model, simulation, estimated state, and the like) based at least in part on the sensor data received from the sensor system. In some examples, the environment representation may include a three-dimensional (3D) representation of the environment and/or a 360-degree video of the environment, including video images of objects depicted therein, though any other representation is contemplated (e.g., including showing, on a screen, a portion of the data associated with a gaze, head-tracking, gesture, etc.). Further, the computing device through which the user interface may display the environment representation may be coupled to a wearable, or head-mounted device. The user device may comprise any type of computing device configured to communicate over networks, such as mobile phones, tablets, laptop computers, desktop computers, televisions, servers, and/or any other type of computing device. The environment representation may also include a representation of one or more features, such as feature, of the environment through which the vehicle is traversing. For example, the environment representation may include a feature that is a person in the environment, an object in the environment, and/or the like. A user interface of the computing device may be configured to output the environment representation of the vehicle. The user interface may include streaming images captured by a camera from sensor systems on the vehicle. In some instances, the representation may be communicated to a user associated with (e.g., using, wearing, etc.) the computing device. In some instances, the user may be a remote operator of a remote location, such as a remote operations service for a fleet of autonomous vehicles, where the remote operator is trained to guide vehicles remotely. This way, the environment representation communicated to the user via the user device may be assessed by the user to provide guidance and/or other input for the vehicle.

The sensor data may also be used to generate semantic data associated with one or more features of the environment. In some instances, the sensor data may be used by the vehicle in order to detect and/or classify objects (e.g., other vehicles, pedestrians, emergency personnel, lanes, buildings, intersections, etc.). In the environment representation, the detected and/or classified objects may be labeled based on semantic data. By way of example, and not limitation, the semantic data may include the distance at which a feature is positioned away from the position of the vehicle. Additionally, or alternatively, the semantic data may include characteristics associated with the features in the environment. In some instances, the computing device may be configured to use the semantic data in order to display semantic information in the environment representation that is displayed to the user associated with the computing device. For example, the semantic information may be displayed as a "label" for one or more features in the environment representation. For example, each feature in the environment representation may be labeled, and/or augmented, with semantic information, such as the distance at which the feature is positioned away from the position of the vehicle. Additionally, or alternatively, the computing system associated with the vehicle may be configured to use the semantic data in order to identify the roles, or identities, of a feature in the environment, such as a pedestrian, emergency personnel, and/or the like. The computing device may display the semantic information such as roles, or identities, as a label for one or more features in the environment representation.

At block 606, the process 600 may include receiving, as natural user input data, one or more of pose data, gesture data, head tracking data, or gaze detection data of a user, wherein the natural user input data includes an indication of a feature in the representation of the environment. In some instances, the computing device may be configured to receive user input by tracking gestures associated with the user of the user device with respect to the environment representation. For example, the user may perform a gesture (e.g., head movement, hand gestures, eye movement, etc.) that may be directed toward a feature in the environment representation (e.g., head movement, hand gesture, and/or eye gaze toward a person in the environment representation). In some instances, user devices may be configured with an array of sensors for tracking user gestures (e.g., inertial sensors, camera sensors, and/or the like). Based on the user input, the computing device coupled with the user device may be configured to determine an indication of the feature in the environment representation. By way of example and not limitation, the computing device may determine, based on the duration at which a user directs their eye gaze at a feature in the environment representation, an indication of the feature in the environment representation. In another example, and not limitation, the computing device may determine, based on the duration at which a user directs their head at a feature in the environment representation, an indication of the feature in the environment representation. Additionally, or alternatively, the computing device may be configured to determine an indication of a feature in the environment representation, where the feature may be a particular point (hereinafter "waypoint") at which the vehicle may traverse. Additionally, or alternatively, the computing device may be configured to determine an indication of a feature in the environment representation based on based user input at the user interface associated with the computing device.

At block 608, the process 600 may include determining, based at least in part on the indication of the feature in the representation, an action associated with the vehicle. For example, upon the determination of an indication of a feature in the environment representation, the computing device may use, and/or work in combination with, a guidance component to determine guidance and/or other input associated with the feature that may be performed by the vehicle. In some instances, the action may include actuating one or more components associated with the vehicle. The action may include the output of audio at one or more speakers of the vehicle. The action may include a suggested trajectory path and/or waypoint(s) to be provided to the vehicle. Additionally, or alternatively, the action may include an adjustment of temperature in the vehicle, the opening of a door of the vehicle, changing lighting, music, sounds, suspension, and/or the like.

The guidance component of the computing device may determine one or more actions based on the indication of the feature in the environment representation indicated by the user, and may cause the one or more actions to be displayed at the user interface as one or more user interface components. A user may interact with the controls of the user interface to generate an input that causes an action to be performed with the vehicle. For example, the user may interact with the controls of the user interface by selecting a control with touch (e.g., via a touchscreen or cursor), such as a user of user device. Additionally, or alternatively, the computing device may be configured to further track user gesture data associated with the user device, such as head motions, hand gestures, and/or eye gaze movement, to identify a selection of an action.

At block 610, the action associated with the vehicle may include transmitting information to the vehicle to output audio. Continuing from the example above, the user may indicate a feature in the environment representation based on head motion and/or eye gaze movement where the user looks at the feature, where the feature is emergency personnel (e.g., a police officer). Based on this indication, the computing device may display, at the user interface, one or more actions that may be performed with respect to the police officer. For example, the action may include the output of an audio message at emitters, where the audio message indicates that there is an emergency associated with the vehicle. Based on further user input, the computing device may then cause the vehicle to perform the action, such as the output of an audio message.

At block 612, the action associated with the vehicle may include transmitting guidance information to assist the vehicle in traversing the environment. For example, in instances where the computing device may be configured to determine an indication of a feature in the virtual environment, where the feature may be a waypoint which may be provided as guidance to the vehicle to assist the vehicle in planning a path to traverse a portion of the environment, a suggested trajectory path based on the waypoints may be provided as guidance to the vehicle.

At block 614, the action associated with the vehicle may include transmitting information to the vehicle to perform any other actions. In some instances, the action may include actuating one or more components associated with the vehicle. For example, the action may include the activation of a visual indicator (e.g., light, display screen, etc.). Additionally, or alternatively, the action may include an adjustment of temperature in the vehicle, the opening of a door of the vehicle, and/or the like. By way of example, and not limitation, based on the location of the feature in the environment representation, the computing device may determine which door(s) to cause to open (e.g., the door(s) with the closest proximity to the feature in the environment representation indicated by the user). Additionally, or alternatively, the user may perform a gesture that may be directed toward the feature in the environment representation, where the feature in the environment representation is a door of the vehicle. Based on the indication of the door of the vehicle in the environment representation, the computing device may cause display of a group of candidate actions associated with the door (e.g., open, close, etc.) as user interface components, such as controls. The user may then interact with the controls so as to send an instruction to open and/or close the door of the vehicle.

Additionally, or alternatively, the process 600 may include wherein the representation is displayed on a head-mounted wearable device, and the representation includes a three-dimensional (3D) representation of the environment.

Additionally, or alternatively, the process 600 may include wherein the 3D representation of the environment comprises 360-degree video of the environment from a perspective of the vehicle.

Additionally, or alternatively, the process 600 may include wherein the representation of the environment further comprises a semantic annotation overlaid on the 360-degree video of the environment.

Additionally, or alternatively, the process 600 may include, wherein the semantic annotation comprises at least one of an indication of an obscured feature in the environment, an indication of an out-of-sight feature in the environment, a classification of the feature, or an identification of the feature.

Additionally, or alternatively, the process 600 may include wherein the natural user input data is associated with guidance to cause a placement of a footprint of the vehicle indicating a pose of the vehicle in the representation, the method further comprising transmitting information to the vehicle to traverse to the pose.

Additionally, or alternatively, the process 600 may include, wherein the information transmitted to the vehicle comprises at least one of an instruction to output audio at speakers associated with the vehicle, an instruction to emit light from a visual emitter associated with the vehicle, guidance information to assist the vehicle with traversing the environment, and/or an instruction to open or close a door of the vehicle.

Additionally, or alternatively, the process 600 may include, wherein the action associated with the vehicle is an output of audio, identifying, based at least in part on the indication of the feature in the representation, a first speaker from a group of speakers associated with the vehicle that is proximate to the feature, and transmitting information to the vehicle to perform the output of audio using the first speaker.

Additionally, or alternatively, the process 600 may include, wherein the indication of the feature comprises an indication of a location or region in the environment, and the information transmitted to the vehicle comprises guidance information to assist the vehicle to navigate through or around the location or region in the environment.

Additionally, or alternatively, the process 600 may include, wherein the natural user input data is first natural user input data, determining, based at least in part on the indication of the feature in the representation, one or more attributes associated with the feature, determining, based at least in part on the one or more attributes, a group of candidate actions, and causing display of the group of candidate actions in the representation. Further, the process 600 may include receiving second natural user input data of the user, wherein the second natural user input data includes an indication of a target action from the group of candidate actions in the representation, and transmitting information to the vehicle to perform the target action from the group of candidate actions.

EXAMPLE CLAUSES

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

A: A system comprising: a wearable computing device; one or more processors; and non-transitory computer-readable storage media storing instructions that, when executed by the one or more processors, cause the system to perform operations comprising: receiving sensor data from a sensor associated with a vehicle traversing an environment; generating, based at least in part on a portion of the sensor data, a representation of the vehicle traversing the environment comprising a feature of the environment; causing display of the representation at a user interface of the wearable computing device, wherein the wearable computing device is remote from the vehicle; receiving, as natural user input data of a user associated with the wearable computing device, one or more of pose data, gesture data, head tracking data, or gaze detection data, wherein the natural user input data includes an indication of the feature; determining, based at least in part on the indication of the feature, an action associated with the vehicle; and transmitting information to the vehicle to perform the action.

B: The system of paragraph A, wherein the action associated with the vehicle is an output of audio, the operations further comprising: identifying, based on the indication of the feature, a speaker from a group of speakers associated with the vehicle; and transmitting information to the vehicle to perform the output of audio using the speaker such that the audio is output in a direction of the feature.

C: The system of any one of paragraphs A or B, wherein: the indication of the feature comprises an indication of a location or region in the environment; and the information transmitted to the vehicle comprises guidance information to assist the vehicle to navigate through or around the location or region in the environment.

D: The system of any one of paragraphs A-C, wherein receiving the natural user input data of the user comprises at least one of: tracking user head motion or position data; or tracking user eye gaze data.

E: A method comprising: receiving sensor data from a sensor associated with a vehicle traversing an environment; causing display of a representation of the environment; receiving, as natural user input data, one or more of pose data, gesture data, head tracking data, or gaze detection data of a user, wherein the natural user input data includes an indication of a feature in the representation of the environment; determining, based at least in part on the indication of the feature in the representation, an action associated with the vehicle; and transmitting information to the vehicle to perform the action.

F: The method of paragraph E, wherein the representation is displayed on a head-mounted wearable device, and the representation includes a three-dimensional (3D) representation of the environment.

G: The method of paragraph F, wherein the 3D representation of the environment comprises 360-degree video of the environment from a perspective of the vehicle.

H: The method of any one of paragraphs E-G, wherein the representation of the environment further comprises a semantic annotation overlaid on the 360-degree video of the environment.

I: The method of paragraph H, wherein the semantic annotation comprises at least one of: an indication of an obscured feature in the environment; an indication of an out-of-sight feature in the environment; a classification of the feature; or an identification of the feature.

J: The method of any one of paragraphs E-I, wherein the natural user input data is associated with guidance to cause a placement of a footprint of the vehicle indicating a pose of the vehicle in the representation, the method further comprising transmitting information to the vehicle to traverse to the pose.

K: The method of any one of paragraphs E-J, wherein the information transmitted to the vehicle comprises at least one of: an instruction to output audio at a speaker associated with the vehicle; an instruction to emit light from a visual emitter associated with the vehicle; guidance information to assist the vehicle with traversing the environment; or an instruction to open or close a door of the vehicle.

L: The method of any one of paragraphs E-K, wherein the action associated with the vehicle is an output of audio, the method further comprising: identifying, based at least in part on the indication of the feature in the representation, a first speaker from a group of speakers associated with the vehicle that is proximate to the feature; and transmitting information to the vehicle to perform the output of audio using the first speaker.

M: The method of any one of paragraphs E-L, wherein: the indication of the feature comprises an indication of a location or region in the environment; and the information transmitted to the vehicle comprises guidance information to assist the vehicle to navigate through or around the location or region in the environment.

N: The method of any one of paragraphs E-M, wherein the natural user input data is first natural user input data, the method further comprising: determining, based at least in part on the indication of the feature in the representation, one or more attributes associated with the feature; determining, based at least in part on the one or more attributes, a group of candidate actions; causing display of the group of candidate actions in the representation; receiving second natural user input data of the user, wherein the second natural user input data includes an indication of a target action from the group of candidate actions in the representation; and transmitting information to the vehicle to perform the target action from the group of candidate actions.

O: A non-transitory computer-readable storage media storing instructions that, when executed, cause one or more processors to perform operations comprising: receiving sensor data from sensor associated with a vehicle traversing an environment; causing display of a representation of the environment; receiving, natural user input data of a user, wherein the natural user input data includes an indication of a feature in the representation of the environment; determining, based at least in part on the indication of the feature in the representation, an action associated with the vehicle; and transmitting information to the vehicle to perform the action.

P: The non-transitory computer-readable storage media of paragraph O, wherein receiving the natural user input data of the user comprises at least one of: receiving user pose data; receiving user gesture data; receiving user head motion or position data; receiving user eye gaze data; receiving user hand motion data; or receiving user audio data.

Q: The non-transitory computer-readable storage media of any one of paragraphs O or P, wherein the information transmitted to the vehicle comprises at least one of: an instruction to output audio at a speaker associated with the vehicle; an instruction to emit light from a visual emitter associated with the vehicle; guidance information to the vehicle to assist the vehicle with traversing the environment; or an instruction to open or close a door of the vehicle.

R: The non-transitory computer-readable storage media of any one of paragraphs O-Q, wherein the action associated with the vehicle is an output of audio, the operations further comprising: identifying, based at least in part on the indication of the feature in the representation, a first speaker from a group of speakers associated with the vehicle that is proximate to the feature; and transmitting information to the vehicle to perform the output of audio using the first speaker.

S: The non-transitory computer-readable storage media of any one of paragraphs O-R, wherein: the indication of the feature comprises an indication of a location or region in the environment; and the information transmitted to the vehicle comprises guidance information to assist the vehicle to navigate through or around the location or region in the environment.

T: The non-transitory computer-readable storage media of any one of paragraphs O-S, wherein the natural user input data is first natural user input data, the operations further comprising: determining, based at least in part on the indication of the feature in the representation, an attribute associated with the feature; determining, based at least in part on the attribute, a group of candidate actions; causing display of the group of candidate actions in the representation; receiving second natural user input data of the user, wherein the second natural user input data includes an indication of a target action from the group of candidate actions in the representation; and transmitting information to the vehicle to perform the action from the group of candidate actions.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
a wearable computing device;
one or more processors; and
non-transitory computer-readable storage media storing instructions that, when executed by the one or more processors, cause the system to perform operations comprising:
receiving sensor data from a sensor associated with a vehicle traversing an environment;
generating, based at least in part on a portion of the sensor data, a representation of the vehicle traversing the environment comprising a feature of the environment;
causing display of the representation at a user interface of the wearable computing device, wherein the wearable computing device is remote from the vehicle;

receiving, natural user input data of a user associated with the wearable computing device, wherein receiving natural user input data of the user comprises at least one of tracking user head motion or position data, or tracking user eye gaze data, and wherein the natural user input data includes an indication of the feature;

determining, based at least in part on the indication of the feature, an action associated with the vehicle; and transmitting information to the vehicle to perform the action.

2. The system of claim 1, wherein the action associated with the vehicle is an output of audio, the operations further comprising:

identifying, based on the indication of the feature, a speaker from a group of speakers associated with the vehicle; and transmitting information to the vehicle to perform the output of audio using the speaker such that the audio is output in a direction of the feature.

3. The system of claim 1, wherein:

the indication of the feature comprises an indication of a location or region in the environment; and the information transmitted to the vehicle comprises guidance information to assist the vehicle to navigate through or around the location or region in the environment.

4. A method comprising:

receiving sensor data from a sensor associated with a vehicle traversing an environment;

generating, based at least in part on the sensor data, a representation of the environment;

causing display of the representation of the environment, wherein the representation is displayed on a head-mounted wearable device, and the representation includes a three-dimensional (3D) representation of the environment;

receiving, as natural user input data, one or more of pose data, gesture data, head tracking data, or gaze detection data of a user, wherein the natural user input data includes an indication of a feature in the representation of the environment;

determining, based at least in part on the indication of the feature in the representation, an action associated with the vehicle; and transmitting information to the vehicle to perform the action.

5. The method of claim 4, wherein the 3D representation of the environment comprises 360-degree video of the environment from a perspective of the vehicle.

6. The method of claim 5, wherein the representation of the environment further comprises a semantic annotation overlaid on the 360-degree video of the environment.

7. The method of claim 6, wherein the semantic annotation comprises at least one of:

an indication of an obscured feature in the environment;

an indication of an out-of-sight feature in the environment;

a classification of the feature; or an identification of the feature.

8. The method of claim 7, wherein the identification of the feature includes a distance between the feature and the vehicle.

9. The method of claim 6, wherein the semantic annotation is overlaid on the 360-degree video of the environment based at least in part on the natural user input data.

10. The method of claim 4, wherein the natural user input data is associated with guidance to cause a placement of a footprint of the vehicle indicating a pose of the vehicle in the representation, the method further comprising transmitting information to the vehicle to traverse to the pose.

11. The method of claim 4, wherein the information transmitted to the vehicle comprises at least one of:

an instruction to output audio at a speaker associated with the vehicle;

an instruction to emit light from a visual emitter associated with the vehicle;

guidance information to assist the vehicle with traversing the environment; or an instruction to open or close a door of the vehicle.

12. The method of claim 4, wherein the action associated with the vehicle is an output of audio, the method further comprising:

identifying, based at least in part on the indication of the feature in the representation, a first speaker from a group of speakers associated with the vehicle that is proximate to the feature; and transmitting information to the vehicle to perform the output of audio using the first speaker.

13. The method of claim 4, wherein:

the indication of the feature comprises an indication of a location or region in the environment; and the information transmitted to the vehicle comprises guidance information to assist the vehicle to navigate through or around the location or region in the environment.

14. The method of claim 4, wherein the natural user input data is first natural user input data, the method further comprising:

determining, based at least in part on the indication of the feature in the representation, one or more attributes associated with the feature;

determining, based at least in part on the one or more attributes, a group of candidate actions;

causing display of the group of candidate actions in the representation;

receiving second natural user input data of the user, wherein the second natural user input data includes an indication of a target action from the group of candidate actions in the representation; and transmitting information to the vehicle to perform the target action from the group of candidate actions.

15. A non-transitory computer-readable storage media storing instructions that, when executed, cause one or more processors to perform operations comprising:

receiving sensor data from sensor associated with a vehicle traversing an environment;

generating, based at least in part on the sensor data, a representation of the environment;

causing display of the representation of the environment, wherein the representation is displayed on a head-mounted wearable device, and the representation includes a three-dimensional (3D) representation of the environment;

receiving, natural user input data of a user, wherein the natural user input data includes an indication of a feature in the representation of the environment;

determining, based at least in part on the indication of the feature in the representation, an action associated with the vehicle; and transmitting information to the vehicle to perform the action.

16. The non-transitory computer-readable storage media of claim 15, wherein receiving the natural user input data of the user comprises at least one of:

receiving user pose data;

receiving user gesture data;

receiving user head motion or position data;

receiving user eye gaze data;

receiving user hand motion data; or receiving user audio data.

17. The non-transitory computer-readable storage media of claim 15, wherein the information transmitted to the vehicle comprises at least one of:

an instruction to output audio at a speaker associated with the vehicle;

an instruction to emit light from a visual emitter associated with the vehicle;

guidance information to the vehicle to assist the vehicle with traversing the environment; or an instruction to open or close a door of the vehicle.

18. The non-transitory computer-readable storage media of claim 15, wherein the action associated with the vehicle is an output of audio, the operations further comprising:

identifying, based at least in part on the indication of the feature in the representation, a first speaker from a group of speakers associated with the vehicle that is proximate to the feature; and transmitting information to the vehicle to perform the output of audio using the first speaker.

19. The non-transitory computer-readable storage media of claim 15, wherein:

the indication of the feature comprises an indication of a location or region in the environment; and the information transmitted to the vehicle comprises guidance information to assist the vehicle to navigate through or around the location or region in the environment.

20. The non-transitory computer-readable storage media of claim 15, wherein the natural user input data is first natural user input data, the operations further comprising:

determining, based at least in part on the indication of the feature in the representation, an attribute associated with the feature;

determining, based at least in part on the attribute, a group of candidate actions;

causing display of the group of candidate actions in the representation;

receiving second natural user input data of the user, wherein the second natural user input data includes an indication of a target action from the group of candidate actions in the representation; and transmitting information to the vehicle to perform the action from the group of candidate actions.

\* \* \* \* \*